United States Patent
Woo et al.

(10) Patent No.: US 11,996,926 B2
(45) Date of Patent: May 28, 2024

(54) METHOD FOR SELECTING BEAM FOR COMMUNICATION, AND ELECTRONIC DEVICE THEREFOR

(71) Applicant: Samsung Electronics Co., Ltd., Gyeonggi-do (KR)

(72) Inventors: Junyoung Woo, Gyeonggi-do (KR); Hyoungjoo Lee, Gyeonggi-do (KR); Taeyoon Kim, Gyeonggi-do (KR); Chaeman Lim, Gyeonggi-do (KR); Euichang Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 17/283,998

(22) PCT Filed: Sep. 18, 2019

(86) PCT No.: PCT/KR2019/012028
§ 371 (c)(1),
(2) Date: Apr. 9, 2021

(87) PCT Pub. No.: WO2020/075978
PCT Pub. Date: Apr. 16, 2020

(65) Prior Publication Data
US 2021/0351835 A1    Nov. 11, 2021

(30) Foreign Application Priority Data
Oct. 11, 2018  (KR) .................. 10-2018-0121324

(51) Int. Cl.
*H04B 7/0408*  (2017.01)
*H04B 7/06*  (2006.01)
*H04B 7/08*  (2006.01)

(52) U.S. Cl.
CPC ........... *H04B 7/088* (2013.01); *H04B 7/0408* (2013.01); *H04B 7/0695* (2013.01); *H04B 7/0857* (2013.01)

(58) Field of Classification Search
CPC ...... H04B 7/065; H04B 7/088; H04B 7/0695; H04L 5/0048; H04W 16/28; H04W 24/04; H04W 48/16
(Continued)

(56) References Cited

U.S. PATENT DOCUMENTS 9,941,586 B2    4/2018  Seol et al.
2017/0208494 A1*  7/2017  Moon ................ H04L 5/0048
(Continued)

FOREIGN PATENT DOCUMENTS

WO    2018/005014 A1    1/2018
WO    2018/017840 A1    1/2018
(Continued)

OTHER PUBLICATIONS

Korean Office Action dated Oct. 24, 2022.
Notice of Patent Grant dated Mar. 7, 2023.

*Primary Examiner* — Harun Chowdhury
(74) *Attorney, Agent, or Firm* — Cha & Reiter, LLC

(57) ABSTRACT

The present invention is for beam selection for communication, and an electronic device may include a housing, at least one antenna array including antenna elements disposed in the housing, or formed in part of the housing, at least one processor electrically or operatively connected with the antenna array, and configured to form a plurality of reception beams (rx beams) having different directions, using the antenna array, and a memory operatively connected with the processor. The memory may stores instructions for causing the processor to measure, by using the plurality of the rx beams, signal strength values of a plurality of tx beams transmitted from at least one base station and having dif-
(Continued)

ferent directions, generate measurement results of (the number of the rx beams)×(the number of the tx beams), and select one of a plurality of methods for selecting one beam pair from among the (the number of the rx beams)×(the number of the tx beams)-ary beam pairs, based at least in part on the measurement results.

11 Claims, 23 Drawing Sheets

(58) Field of Classification Search
USPC .................................. 370/216, 328, 329, 331
See application file for complete search history.

(56) References Cited

U.S. PATENT DOCUMENTS

| | | |
|---|---|---|
| 2017/0251460 A1 | 8/2017 | Agiwal et al. |
| 2018/0139742 A1 | 5/2018 | Sun et al. |
| 2018/0199328 A1 | 7/2018 | Sang et al. |
| 2018/0288757 A1* | 10/2018 | Sun ....................... H04B 7/088 |

FOREIGN PATENT DOCUMENTS

| | | |
|---|---|---|
| WO | 2018/064348 A1 | 4/2018 |
| WO | 2018/085601 A1 | 5/2018 |

* cited by examiner

: TARGET BEAM

: ADJACENT BEAM

: TARGET BEAM

: NON-ADJACENT BEAM

[SSB #1]　1410

| RX BEAM INDEX | h0 | h1 | h2 |
|---|---|---|---|
| v0 |  | -90 |  |
| v1 | -90 | -65 | -90 |
| v2 |  | -80 |  |

[SSB #2]　1420

| RX BEAM INDEX | h0 | h1 | h2 |
|---|---|---|---|
| v0 |  | -70 |  |
| v1 | -70 | -65 | -75 |
| v2 |  | -70 |  |

SELECT

FIG.14

METHOD FOR SELECTING BEAM FOR COMMUNICATION, AND ELECTRONIC DEVICE THEREFOR

CROSS REFERENCE TO RELATED APPLICATIONS

This application is a National Phase Entry of PCT International Application No. PCT/KR2019/012028, which was filed on Sep. 18, 2019, and claims a priority to Korean Patent Application No. 10-2018-0121324, which was filed on Oct. 11, 2018, the contents of which are incorporated herein by reference.

TECHNICAL FIELD

Various embodiments of the present invention relate to a beam selection method for communication and an electronic device thereof.

BACKGROUND ART

New Radio (NR) of 5th-generation (5G) system called NR is expected to be operated by including a higher frequency than a long term evolution (LTE) cellular communication system of a conventional 4th-generation (4G) system. Due to the high frequency band, since a transmit signal is expected to be attenuated considerably, applying beamforming technology is considered to compensate for this. If applying the beamforming technology, a base station and a terminal may transmit and/or receive a signal by performing the beamforming.

DISCLOSURE OF INVENTION

Technical Problem

In general, a terminal may select an optimal beam pair by considering only a maximum value of reference signal received power (RSRP) values of received signals. In this case, if the terminal moves, or if a signal is blocked by people or an object indoors, the RSRP may be rapidly lowered. In addition, communication may be delayed due to data loss or beam failure in a severe case.

Hence, various embodiments of the present invention may provide a beam selection method for stability of data connection and an electronic device thereof.

Solution to Problem

According to various embodiments of the present invention, an electronic device may include a housing, at least one antenna array including antenna elements disposed in the housing, or formed in part of the housing, at least one processor electrically or operatively connected with the antenna array, and configured to form a plurality of reception beams (rx beams) having different directions, using the antenna array, and a memory operatively connected with the processor. The memory may stores instructions for causing the processor to measure, by using the plurality of the rx beams, signal strength values of a plurality of tx beams transmitted from at least one base station and having different directions, generate measurement results of (the number of the rx beams)×(the number of the tx beams), and select one of a plurality of methods for selecting one beam pair from among the (the number of the rx beams)×(the number of the tx beams)-ary beam pairs, based at least in part on the measurement results.

According to various embodiments of the present invention, an electronic device may include a communication module, a memory and a processor. the processor may perform beam search, generate measurement results of pairs of tx beams and rx beams through the beam search, and select an optimal beam pair based on average values of received strength values for the beam pairs of the rx beams for the tx beams indicated by the generated measurement results.

According to various embodiments, an operating method of an electronic device may include, performing beam search with a base station, generating measurement results of pairs of tx beams and rx beams through the beam search, and selecting an optimal beam pair based on average values of received strength values for the beam pairs of the rx beams for the tx beams indicated by the generated measurement results.

ADVANTAGEOUS EFFECTS OF INVENTION

A method and an electronic device according to various embodiments may select an optimal beam pair by considering relationships between a plurality of reception (rx) beams, for example, distribution of reference signal received power (RSRP) values for beam pairs, and thus prevent signal quality degradation due to terminal movement of or signal blocking.

BRIEF DESCRIPTION OF DRAWINGS

FIG. 14 is an example of beam pair selection results with mobility in an electronic device according to various embodiments.

BEST MODE FOR CARRYING OUT THE INVENTION

Hereinafter, various embodiments are described in detail with reference to the accompanying drawings.

Figure 1:
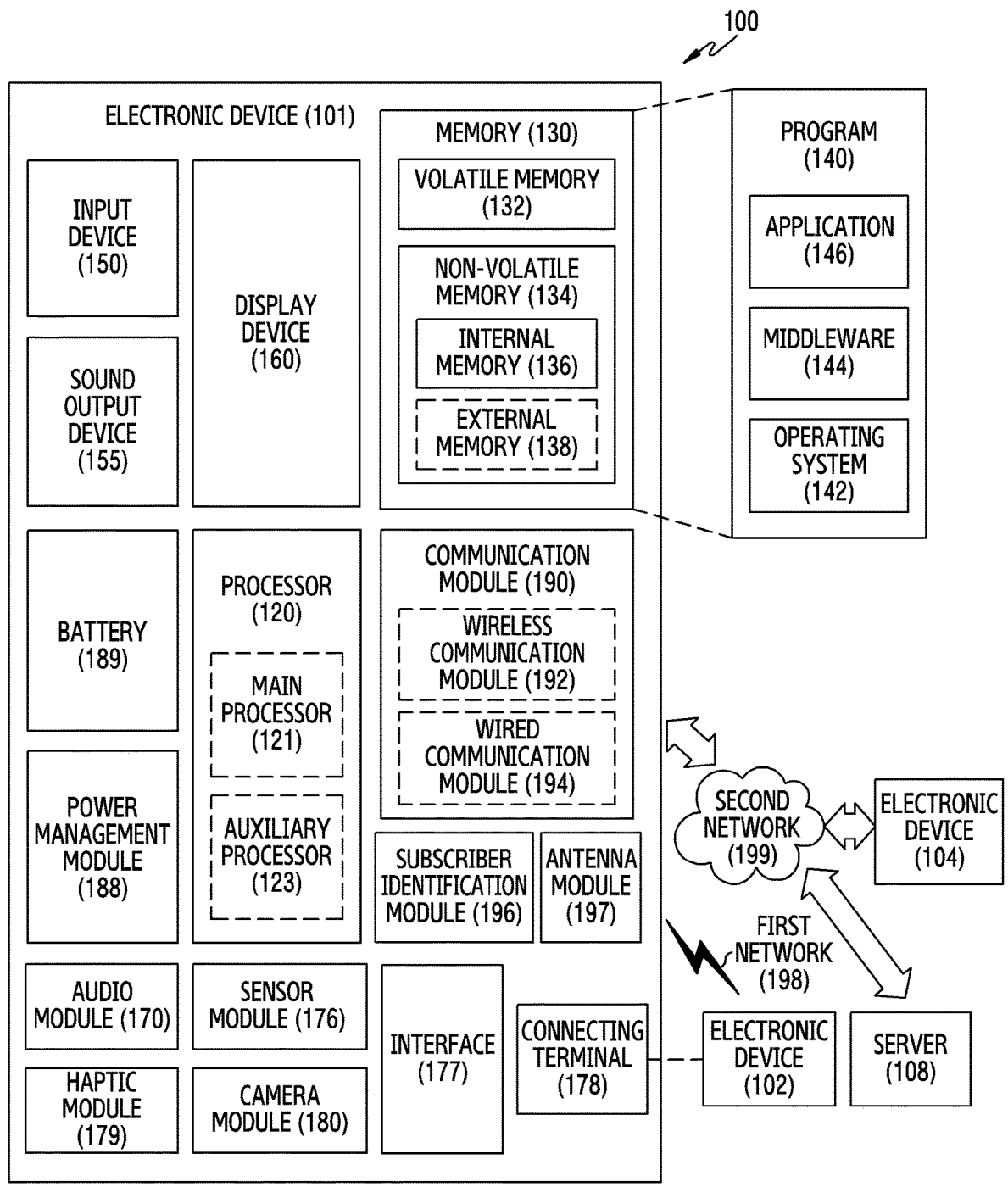
FIG. 1 is a block diagram of an electronic device in a network environment according to various embodiments.

FIG. 1 is a block diagram of an electronic device 101 in a network environment 100 according to various embodiments. Referring to FIG. 1, the electronic device 101 in the network environment 100 may communicate with an electronic device 102 over a first network 198 (e.g., a short-range wireless communication network), or with an electronic device 104 or a server 108 over a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In an embodiment, in the electronic device 101, at least one (e.g., the display device 160 or the camera module 180) of the components may be omitted, or one or more other components may be added. In an embodiment, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may control at least one other component (e.g., a hardware or software component) of the electronic device 101 coupled with the processor 120 by, for example, executing software (e.g., a program 140), and perform various data processing or calculations. According to an embodiment, as at least part of the data processing or calculation, the processor 120 may load a command or data received from other component (e.g., the sensor module 176 or the communication module 190) in a volatile memory 132, process the command or the data stored in the memory 132, and store resulting data in a non-volatile memory 134. According to an embodiment, the processor 120 may include a main processor 121 (e.g., a central processing device or an application processor), and an auxiliary processor 123 (e.g., a graphics processing device, an image signal processor, a sensor hub processor, or a communication processor) which is operable independently from or in conjunction with it. Additionally or alternatively, the auxiliary processor 123 may be configured to consume less power than the main processor 121, or to be specialized for a designated function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, for example, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of other component (e.g., the camera module 180 or the communication module 190) functionally related.

The memory 130 may store various data used by at least one component (e.g., the processor 120 or the sensor module 176) of the electronic device 101. The data may include, for example, software (e.g., the program 140), and input data or output data for a command related thererto. The memory 130 may include the volatile memory 132 or the non-volatile memory 134.

The program 140 may be stored as software in the memory 130, and may include, for example, an operating system 142, middleware 144 or an application 146.

The input device 150 may receive a command or data to be used by a component (e.g., the processor 120) of the electronic device 101 from outside (e.g., a user) of the electronic device 101. The input device 150 may include, for example, a microphone, a mouse, a keyboard or a digital pen (e.g., a stylus pen).

The sound output device 155 may output a sound signal to the outside of the electronic device 101. The sound output device 155 may include, for example, a speaker or a receiver. The speaker may be used for a general purpose such as multimedia play or record play, and the receiver may be used to receive an incoming call. According to an embodiment, the receiver may be implemented separately from, or as part of the speaker.

The display device 160 may visually provide information to the outside (e.g., the user) of the electronic device 101. The display device 160 may include, for example, a display, a hologram device, or a projector and control circuitry for controlling a corresponding device. According to an embodiment, the display device 160 may include touch circuitry configured configured to detect a touch, or sensor circuitry (e.g., a pressure sensor) configured to measure an intensity of force generated by the touch.

The audio module 170 may convert a sound into an electrical signal, or vice versa. According to an embodiment, the audio module 170 may obtain the sound via the input device 150, or output the sound through the sound output device 155, or an external electronic device (e.g., the electronic device 102) (e.g., a speaker or a headphone) directly or wirelessly coupled with the electronic device 101.

The sensor module 176 may detect an operational state (e.g., power or temperature) of the electronic device 101, or an external environmental state (e.g., a user state), and generate an electrical signal or a data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols to be used to connect the electronic device 101 with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector through which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by the user via his/her tactile or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable or a fuel cell.

The communication module 190 may support establishment of a direct (e.g., wired) communication channel or a wireless communication channel between the electronic device 101 and the external electronic device (e.g., the electronic device 102, the electronic device 104, or the server 108) and communication over the established communication channel. The communication module 190 may include one or more communication processors which are operated independently from the processor 120 (e.g., the application processor) and supports the direct (e.g., wired) communication or the wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding communication module of these communication modules may communicate with the external electronic device via the first network 198 (e.g., a short-range communication network such as Bluetooth, wireless-fidelity (Wi-Fi) direct, or infrared data association (IrDA)) or the second network 199 (e.g., a long-range communication network such as a cellular network, Internet, or a computer network (e.g., LAN or wide area network (WAN)). These communication modules of various types may be integrated as a single component (e.g., a single chip), or may be implemented as a plurality of components (e.g., a plurality of chips) separated from each other. The wireless communication module 192 may identify and authenticate the electronic device 101 in the communication network such as the first network 198 or the second network 199 using subscriber information (e.g., international mobile subscriber identity (IMSI)) stored in the subscriber identification module 196.

The antenna module 197 may transmit or receive a signal or power to or from the outside (e.g., the external electronic device). The antenna module may be formed with a conductor or a conductive pattern according to an embodiment, and may further include other component (e.g., an RFIC) in addition to the conductor or the conductive pattern according to an embodiment. According to an embodiment, the antenna module 197 may include one or more antennas, and, therefrom, at least one antenna appropriate for a communication scheme used in the communication network such as the first network 198 or the second network 199, may be selected, for example, by the communication module 190. The signal or the power may be transmitted or received between the communication module 190 and the external electronic device via the selected at least one antenna.

At least some of the above components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 connected to the second network 199. The electronic devices 102 and 104 each may be a device of the same type as or a different type from the electronic device 101. According to an embodiment, all or some of operations executed at the electronic device 101 may be executed at one or more external electronic devices of the external electronic devices 102, 104, or 108. For example, if the electronic device 101 needs to perform a function or a service automatically, or in response to a request from the user or other device, the electronic device 101 may, instead of or in addition to executing the function or the service, request the one or more external electronic devices to perform at least part of the function or the service. The one or more external electronic devices receiving the request may perform the at least part of the function or the service requested, or an additional function or service related to the request, and transfer an execution result to the electronic device 101. The electronic device 101 may provide the result, with or without further processing, as at least part of a response to the request. For doing so, for example, cloud computing, distributed computing, or client-server computing technology may be used.

Figure 2:
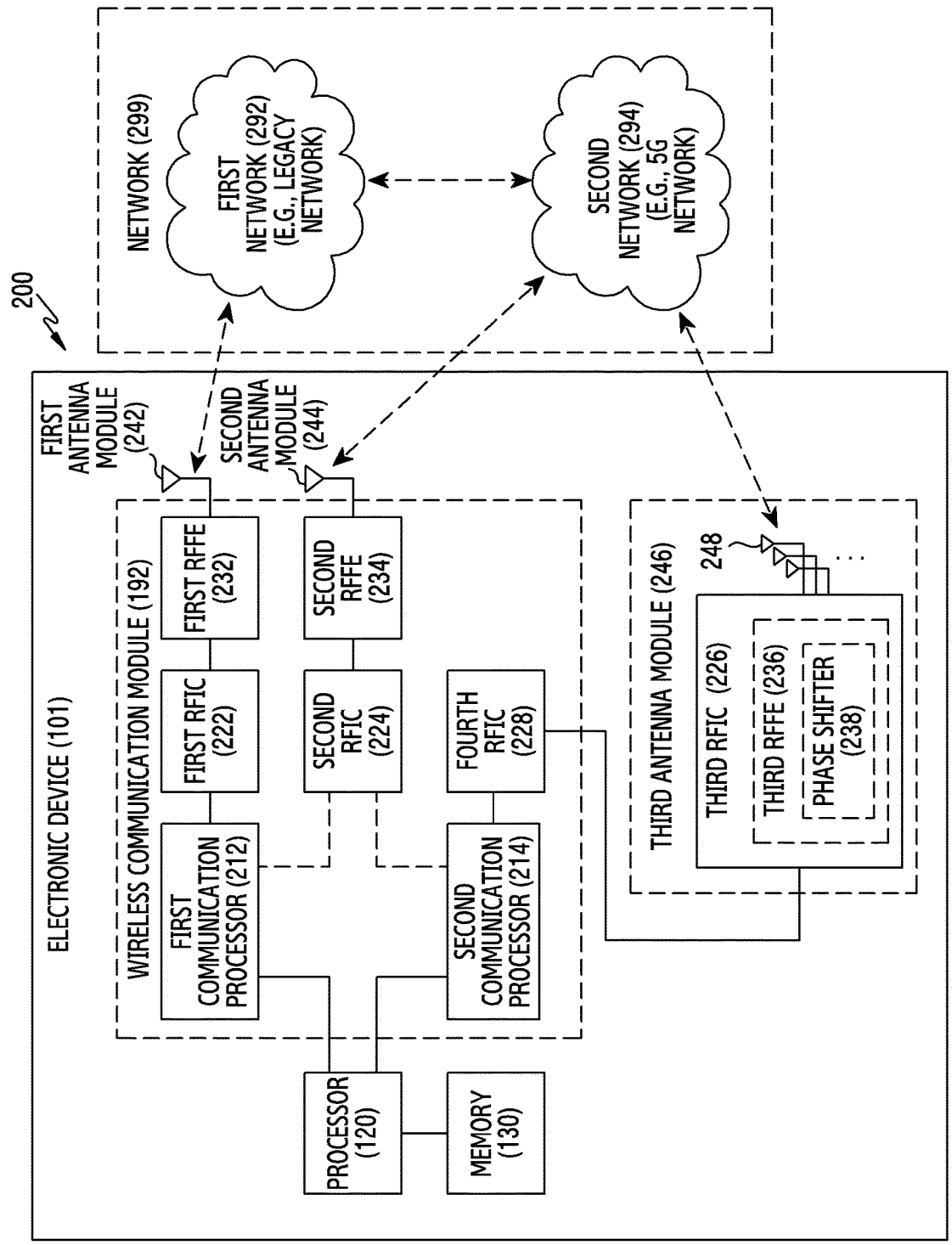
FIG. 2 is a block diagram of an electronic device for supporting legacy network communication and 5th-generation (5G) network communication according to various embodiments.

FIG. 2 is a block diagram 200 of an electronic device 101 for supporting legacy network communication and 5th-generation (5G) network communication, according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 299 may include a first network 292 and a second network 294. According to another embodiment, the electronic device 101 may further include at least one of the components described in FIG. 1, and the network 299 may include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted, or may be formed as part of the third RFIC 226.

The first communication processor 212 may establish a communication channel of a band to be used for the wireless communication with the first network 292, and support the legacy network communication over the established communication channel. According to various embodiments, the first network may be a legacy network including a 2nd generation (2G), 3rd generation (3G), or 4G or LTE network. The second communication processor 214 may establish a communication channel corresponding to a designated band (e.g., about 6 GHz~about 60 GHz) among bands to be used for radio communication with the second network 294, and support the 5G network communication over the established communication channel. According to various embodiments, the second network 294 may be a 5G network defined by 3rd generation partnership project (3GPP). Additionally, according to an embodiment, the first communication processor 212 or the second communication processor 214 may establish a communication channel corresponding to other designated band (e.g., below 6 GHz) of the bands to be used for the radio communication with the second network 249, and support the 5G network communication over the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

The first RFIC 222 may, in transmission, convert a baseband signal generated by the first communication processor 212 to a radio frequency (RF) signal of about 700 MHz through about 3 GHz used for the first network 292 (e.g., the legacy network). In the reception, an RF signal may be acquired from the first network 292 (e.g., the legacy network) via an antenna (e.g., the first antenna module 242), and preprocessed through an RFFE (e.g., the first RFFE 232). The first RFIC 222 may convert the preprocessed RF signal to a baseband signal to be processed by the first communication processor 212.

The second RFIC 224 may, in transmission, convert the baseband signal generated by the first communication processor 212 or the second communication processor 214 to an RF signal (hereinafter, a 5G Sub6 RF signal) of a Sub6 band (e.g., below about 6 GHz) used in the second network 294 (e.g., the 5G network). In reception, the 5G Sub6 RF signal may be obtained from the second network 294 (e.g., the 5G network) via an antenna (e.g., the second antenna module 244), and preprocessed through an RFFE (e.g., the second RFFE 234). The second RFIC 224 may convert the preprocessed 5G Sub6 RF signal to a baseband signal to be processed by a corresponding communication processor of the first communication processor 212 and the second communication processor 214.

The third RFIC 226 may convert the baseband signal generated by the second communication processor 214 to an RF signal (hereinafter, a 5G Above6 RF signal) of a 5G Above6 band (e.g., about 6 GHz through about 60 GHz) to be used in the second network 294 (e.g., the 5G network). In reception, a 5G Above6 RF signal may be obtained from the second network 294 (e.g., the 5G network) via an antenna (e.g., the antenna 248) and preprocessed through the third RFFE 236. The third RFIC 226 may convert the preprocessed 5G Above6 RF signal to a baseband signal to be processed by the second communication processor 214. According to an embodiment, the third RFFE 236 may be formed as part of the third RFIC 226.

According to an embodiment, the electronic device 201 may include the fourth RFIC 228, separately from or as at least part of the third RFIC 226. In this case, the fourth RFIC 228 may convert the baseband signal generated by the second communication processor 214 to an RF signal (hereinafter, an intermediate frequency (IF) signal) of an IF band (e.g., about 9 GHz through about 11 GHz), and forward the IF signal to the third RFIC 226. The third RFIC 226 may convert the IF signal to a 5G Above6 RF signal. For reception, a 5G Above6 RF signal may be received from the second network 294 (e.g., the 5G network) via an antenna (e.g., the antenna 248) and converted to an IF signal by the third RFIC 226. The fourth RFIC 228 may convert the IF signal to a baseband signal to be processed by the second communication processor 214.

According to an embodiment, the first RFIC 222 and the second RFIC 224 may be implemented at least part of a single chip or a single package. According to an embodiment, the first RFFE 232 and the second RFFE 234 may be implemented as at least part of a single chip or a single package. According to an embodiment, at least one antenna module of the first antenna module 242 or the second antenna module 244 may be omitted or combined with other antenna module to process RF signals in a plurality of corresponding bands.

According to an embodiment, the third RFIC 226 and the antenna 248 may be disposed on the same substrate and form the third antenna module 246. For example, the wireless communication module 192 or the processor 120 may be disposed on a first substrate (e.g., a main PCB). In this case, the third RFIC 226 may be disposed in some area (e.g., a bottom surface) of a second substrate (e.g., a sub PCB) which is separated from the first substrate, and the antenna 248 may be disposed in other some region (e.g., a top surface), to form the third antenna module 246. By disposing the third RFIC 226 and the antenna 248 on the same substrate, it may be possible to reduce a length of a transmission line between them. This may, for example, reduce loss (attenuation) of a signal in a high frequency band (e.g., about 6 GHz through about 60 GHz) used in the 5 network communication due to the transmission line. Thus, the electronic device 201 may improve a quality or a speed of the communication with the second network 294 (e.g., the 5G network).

According to an embodiment, the antenna 248 may be formed as an antenna array including a plurality of antenna elements which may be used for beamforming. In this case, the third RFIC 226 may include, as part of the third RFFE 236, a plurality of phase shifters 238 corresponding to the plurality of the antenna elements. In transmission, the plurality of the phase shifters 238 each may shift a phase of a 5G Above6 RF signal to be transmitted to outside (e.g., a 5G network base station) of the electronic device 201 via a corresponding antenna element. In reception, the plurality of the phase shifters 238 each may shift the phase of the 5G Above6 RF signal received from the outside via a corresponding antenna element to an identical or substantially identical phase. This enables the transmission or the reception through the beamforming between the electronic device 101 and the outside.

The second network 294 (e.g., the 5G network) may operate independently of (e.g., stand-alone (SA)) or in association with (e.g., non-stand alone (NSA)) the first network 292 (e.g., the legacy network). For example, the 5G network may include only an access network (e.g., a 5G radio access network (RAN) or a next generation RAN (NG RAN)), without a core network (e.g., a next generation core (NGC)). In this case, the electronic device 201 may access the access network of the 5G RAN, and then access an external network (e.g., Internet) under control of a core network of a legacy system (e.g., evolved packet core (EPC)). Protocol information (e.g., LTE protocol information) for communication with the legacy network and protocol information (e.g., New Radio (NR) protocol information) for communication with the 5 network may be stored in the memory 230, and accessed by other component (e.g., the processor 220, the first communication processor 212, or the second communication processor 214).

Figure 3:
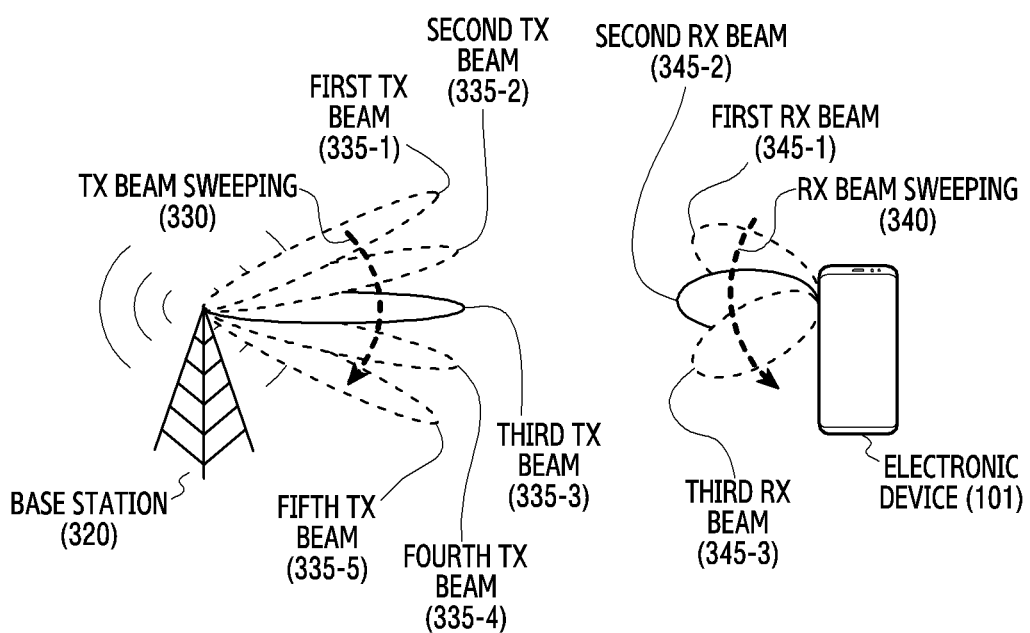
FIG. 3 is an example of operations for wireless communication connection between a base station and an electronic device using a directional beam for wireless connection.

FIG. 3 illustrates an embodiment of operations for wireless communication connection between a base station 320 and the electronic device 101, in the second network 294 (e.g., the 5G network) of FIG. 2, which uses a directional beam for the wireless connection. First, the base station (a gNodeB (gNB), a transmission reception point (TRP)) 320 may perform a beam detection operation with the electronic device 101, for the wireless communication connection. In the illustrated embodiment, for the beam detection, the base station 320 may perform one tx beam sweeping 330, by sequentially transmitting a plurality of tx beams, for example, first through fifth tx beams 335-1 through 335-5 having different directions.

The first through fifth tx beams 335-1 through 335-5 may include at least one synchronization sequences (SS)/physical broadcast channel (PBCH) block. The SS/PBCH block may be used to periodically measure a channel, or a beam intensity of the electronic device 101.

In another embodiment, the first through fifth tx beams 335-1 through 335-5 may include at least one channel state information-reference signal (CSI-RS). The CSI-RS is a reference/reference signal which may be flexibly set by the base station 320 and may be transmitted on a periodic/semi-persistent or aperiodic basis. The electronic device 101 may measure the channel and the beam intensity using the CSI-RS.

The tx beams may form a radiation pattern having a selected beam width. For example, the tx beams may have a broad radiation pattern having a first beam width, or a sharp radiation pattern having a second beam width which is narrower than the first beam width. For example, the tx beams including the SS/PBCH block may have a wider radiation pattern than the tx beam including the CSI-RS.

The electronic device 101 may perform rx beam sweeping 340, while the base station 320 performs the tx beam sweeping 330. For example, while the base station 320 performs the first tx beam sweeping 330, the electronic device 101 may receive a signal of the SS/PBCH block transmitted in at least one of the first through fifth tx beams 335-1 through 335-5 by fixing a first rx beam 345-1 in a first direction. While the base station 320 performs the second tx beam sweeping 330, the electronic device 101 may receive a signal of the SS/PBCH block transmitted in the first through fifth tx beams 335-1 through 335-5 by fixing a second rx beam 345-2 in a second direction. As such, the electronic device 101 may select the communicable rx beam (e.g., the second rx beam 345-2) and tx beam (e.g., the third tx beam 335-3), based on the signal reception operation result through the rx beam sweeping 340.

As above, after the communicable tx and rx beams are determined, the base station 320 and the electronic device 101 may transmit and/or receive basic information for cell configuration, and set information for additional beam management based on this. For example, the beam management information may include detailed information of a configured beam, and configuration information of the SS/PBCH block, the CSI-RS, or an additional reference signal.

Also, the electronic device 101 may continuously monitor the channel and the beam intensity using at least one of the SS/PBCH block and the CSI-RS included in the tx beam. The electronic device 101 may adaptively select a beam having good beam quality using the monitoring operation. Optionally, if the communication connection is released due to movement of the electronic device 101 or beam blocking, the communicable beam may be determined by re-performing the above beam sweeping operation.

Figure 4:
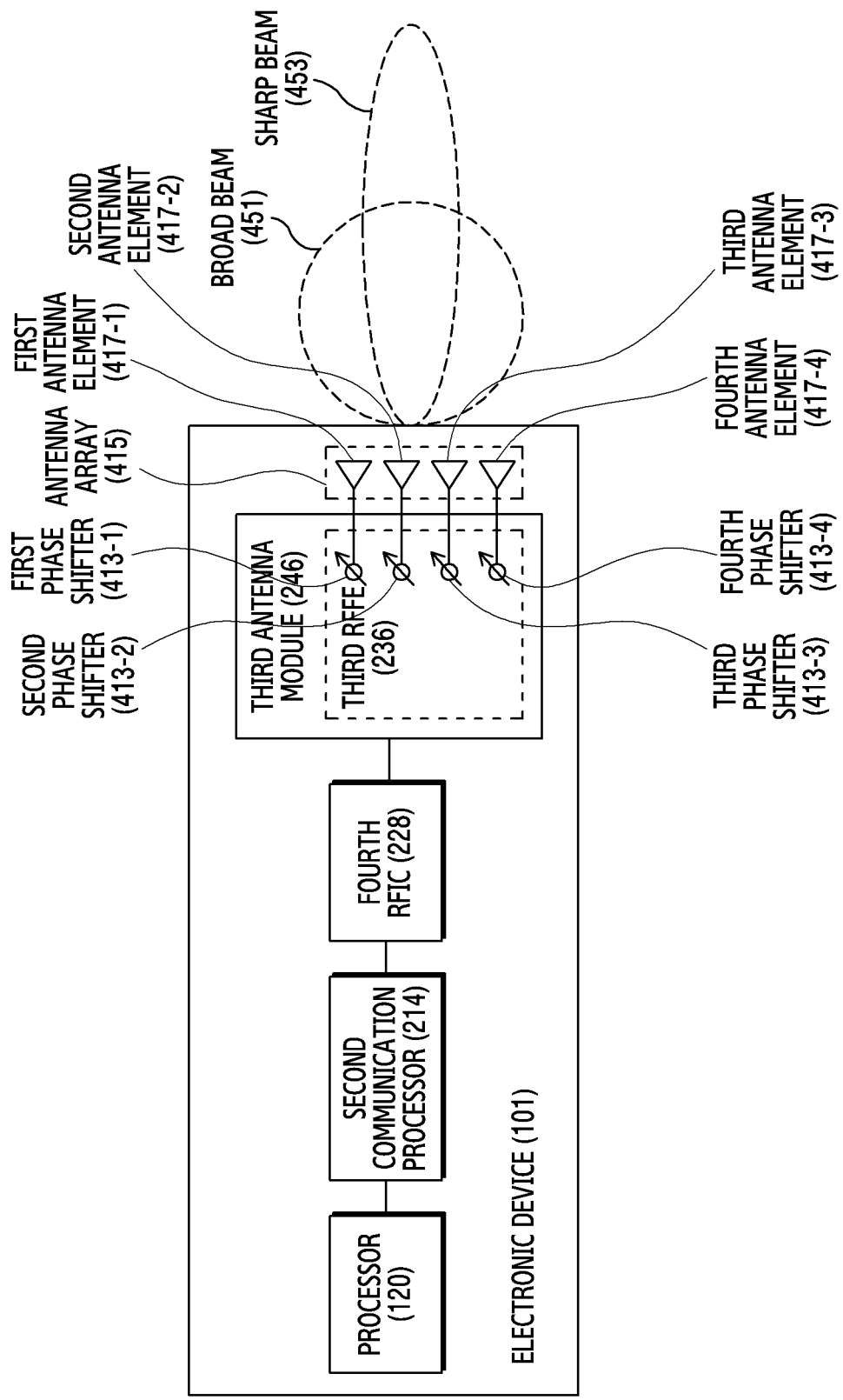
FIG. 4 is a block diagram of an electronic device for 5G network communication according to various embodiments.

FIG. 4 is a block diagram of an electronic device 101 for 5G network communication, according to an embodiment. The electronic device 101 may include various components shown in FIG. 2, but in FIG. 4, for brief descriptions, includes the processor 120, the second communication processor 214, the fourth RFIC 228, and at least one third antenna module 246.

In the depicted embodiment, the third antenna module 246 may include first through fourth phase shifters 413-1 through 413-4 (e.g., the phase shifter 238 of FIG. 2) and/or first through fourth antenna elements 417-1 through 417-4 (e.g., the antenna 248 of FIG. 2). Each one of the first through fourth antenna elements 417-1 through 417-4 may be electrically connected to an individual one of the first through fourth phase shifters 413-1 through 413-4. The first through fourth antenna elements 417-1 through 417-4 may form at least one antenna array 415.

The second communication processor 214 may control phases of signals transmitted and/or received through the first through fourth antenna elements 417-1 through 417-4, by controlling the first through fourth phase shifters 413-1 through 413-4, and thus generate a tx beam and/or an rx beam in a selected direction.

According to an embodiment, the third antenna module 246 may generate a broad radiation pattern beam 451 (hereinafter, "a broad beam") or a sharp radiation pattern beam 453 (hereinafter, "a sharp beam") as described above according to the number of the antenna elements used. For example, the third antenna module 246 may generate the sharp beam 453 if using all of the first through fourth antenna elements 417-1 through 417-4, and may generate the broad beam 451 if using only the first antenna element 417-1 and the second antenna element 417-2. The broad beam 451 may have wider coverage but a smaller antenna gain than the sharp beam 453 and thus may be more effective for beam search. By contrast, the sharp beam 453 may have narrower coverage but a higher antenna gain than the broad beam 451 and thus may improve communication performance.

According to an embodiment, the second communication processor 214 may utilize the sensor module 176 (e.g., a 9-axis sensor, a grip sensor, or a GPS) for the beam search. For example, the electronic device 101 may adjust a beam search position and/or a beam search period based on a position and/or a movement of the electronic device 101 using the sensor module 176. As another example, if the electronic device 101 is held by the user, an antenna module having better communication performance among the plurality of the third antenna modules 246 may be selected, by obtaining the portion held the user, using a grip sensor.

According to various embodiments, an electronic device (e.g., the electronic device 101) may include a housing, at least one antenna array (e.g., the antenna module 197) including antenna elements disposed in the housing, or formed in part of the housing, at least one processor (e.g., the processor 12) electrically or operatively connected with the antenna array (e.g., the antenna module 197), and configured to form N-ary reception beams (rx beams) having different directions, using the antenna array, and a memory (e.g., the memory 130) operatively connected with the processor (e.g., the processor 120). The memory (e.g., the memory 130) may store instructions for, when executed, causing the processor (e.g., the processor 120) to generate N×M-ary measurement results, by measuring signal strength values of M-ary transmission beams (tx beams) transmitted from at least one base station and having different directions, using the N-ary rx beams, and select one of a plurality of methods for selecting a beam pair among the N x M-ary beam pairs, based at least in part on the measurement results, wherein the N and M may be integers greater than or equal to 2.

According to various embodiments, the processor (e.g., the processor 120) may at least temporarily store in the memory at least one identification information of at least one rx beam selected according to a direction of a rx beam included in the selected beam pair, based at least in part on the measurement results.

According to various embodiments, the processor (e.g., the processor 120) may determine a state of the electronic device, based at least in part on the measurement results, select the one of the plurality of the methods, based at least in part on the determined state, select the beam pair by the selected method, and establish a beam pair link using the selected beam pair.

According to various embodiments, the plurality of the methods may include a first method for selecting a first beam pair including a first rx beam and a first tx beam, if the state is a first state, among the N-ary rx beams, the first rx beam may indicate the greatest measurement value with respect to the first tx beam, and the instructions may cause the processor to establish a first beam pair link using the first beam pair.

According to various embodiments, the plurality of the methods may include a second method for selecting a second beam pair including a second rx beam and a second tx beam, if the state is a second state in which mobility is greater than the first state, among the N-ary rx beams, the second rx beam may indicate the greatest measurement value with respect to the second tx beam, the second rx beam may be selected by considering measurement values of the second tx beam using rx beams adjacent to the second rx beam, selected according to the direction of the second rx beam, and the instructions may cause the processor to establish a second beam pair link using the second beam pair.

According to various embodiments, the instructions may cause the processor (e.g., the processor 120) to identify a plurality of angle values formed by each of the direction of the second rx beam and directions of other rx beams, and select a plurality of rx beams for an angle value lower than a first threshold among the angle values as the adjacent rx beams.

According to various embodiments, the processor (e.g., the processor 120) may at least temporarily store a plurality of identification information of the adjacent rx beams in the memory.

According to various embodiments, the instructions cause the processor (e.g., the processor 120) to, if a signal strength value measured through the second beam pair link falls below a second threshold, establish a third beam pair link by using a third rx beam included in the stored adjacent rx beams.

According to various embodiments, the plurality of the methods may include a third method for selecting a third beam pair including a third rx beam and a third tx beam, if the state is a third state in which signal blocking from outside is greater than the first state, among the N-ary rx beams, the third rx beam may indicate the greatest measurement value for the third tx beam, the third rx beam may be selected by considering measurement values of the third tx beam using a plurality of non-adjacent rx beams to the third rx beam, selected according to a direction of the third rx beam, and the instructions may cause the processor to establish a third beam pair link using the third beam pair.

According to various embodiments, the instructions may cause the processor (e.g., the processor 120) to identify a plurality of angle values formed by the direction of the first rx beam and directions of other rx beams, and determine a plurality of rx beams for angle values higher than a third threshold among the angle values as the non-adjacent rx beams.

According to various embodiments, the instructions cause to, if the signal strength value measured through the first beam pair link falls below a fourth threshold, establish a fourth beam pair link using the fourth rx beam included in the non-adjacent rx beams.

According to various embodiments, an electronic device (e.g., the electronic device 101) may include a communication module (e.g., the communication module 190), and a processor (e.g., the processor 120). The processor (e.g., the processor 120) may perform beam search, generate measurement results of pairs of tx beams and rx beams through the beam search, and select an optimal beam pair based on received strength average values for beam pairs of tx beams and rx beams determined from the measurement results.

According to various embodiments, the processor (e.g., the processor 120) may calculate the received strength average values of the rx beams for each tx beam, and select the optimal beam pair based on the received strength average values of the rx beams for each tx beam.

According to various embodiments, the processor (e.g., the processor 120) may select a rx beam for a tx beam having the greatest reception strength average value and a tx beam having the greatest received strength average value as the optimal beam pair.

According to various embodiments, the processor (e.g., the processor 120) may determine whether a condition for selecting the optimal beam pair is satisfied in a mobility state, and if the condition is satisfied, select the optimal beam pair by considering received strength average values of adjacent rx beams.

According to various embodiments, the condition for selecting the optimal beam pair in the mobility state may include that, a difference of a received strength of the rx beam having the greatest received strength average value among the received strength average values of the adjacent rx beams and the greatest received strength for pairs of tx beams and rx beams falls within a threshold.

According to various embodiments, the processor (e.g., the processor 120) may determine whether a condition for selecting the optimal beam pair is satisfied in a signal blocking state, and if the condition is satisfied, select the optimal beam pair by considering received strength average values of non-adjacent rx beams.

According to various embodiments, the condition for selecting the optimal beam pair in the signal blocking state may include that, a difference of a received strength of the rx beam having the greatest received strength average value among the received strength average values of the non-adjacent rx beams and the greatest received strength for the pairs of the tx beams and the rx beams falls within a threshold.

According to various embodiments, the processor (e.g., the processor 120) may determine one operation mode corresponding to the mobility state or the signal blocking state, an operation mode corresponding to the mobility state may be a mobility improvement mode for selecting the optimal beam pair by considering adjacent rx beams, and an operation mode corresponding to the signal blocking state may be a blocking improvement mode for selecting the optimal beam pair by considering non-adjacent rx beams.

According to various embodiments, the processor (e.g., the processor 120) may determine a received strength set for the rx beams for each tx beam including the rx beam having the greatest received strength, control to operate in the mobility improvement mode if received strength of adjacent rx beams are strong in the received strength set, and control to operate in the blocking improvement mode if received strength of non-adjacent rx beams are strong in the received strength set.

According to various embodiments, the processor (e.g., the processor 120) may determine whether a location of the electronic device is indoor or outdoor, control to operate in a mobility improvement mode if the electronic device is located outdoor, and control to operate in a blocking improvement mode if the electronic device is located indoor.

According to various embodiments, the processor (e.g., the processor 120) may monitor a beam pair link, and change the operation mode based on the monitoring.

Figure 5:
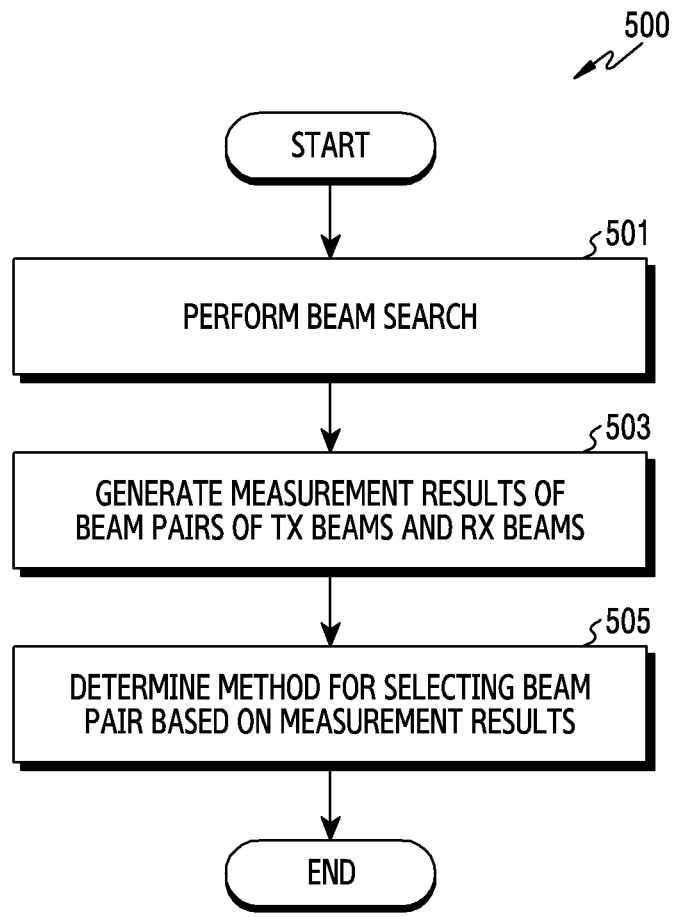
FIG. 5 is a flowchart for selecting a beam pair by considering a reception (rx) beam set in an electronic device according to various embodiments.
Figure 6:
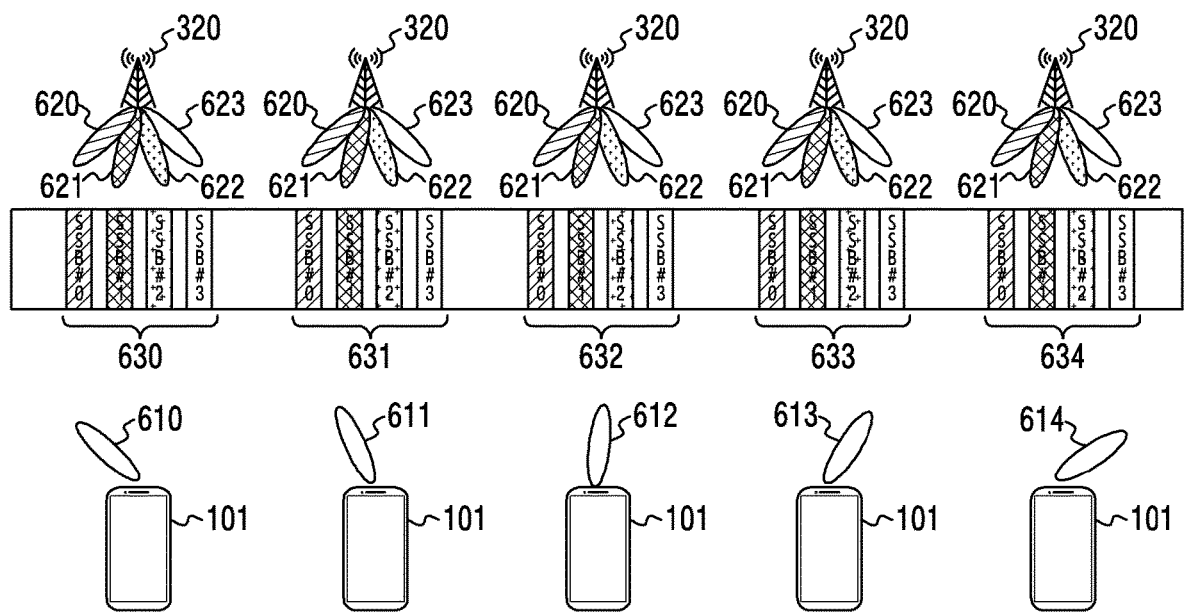
FIG. 6 is an example of transmission (tx)/reception (rx) beam search operations between a base station and an electronic device according to various embodiments.

FIG. 5 is a flowchart 500 for selecting a beam pair by considering a rx beam set in an electronic device 101 according to various embodiments. FIG. 6 is an example of tx beam and/or rx beam search operations between a base station and an electronic device according to various embodiments. An operating subject of the flowchart 500 illustrated in FIG. 5 may be understood as the electronic device 101 or a component (e.g., the processor 120) of the electronic device 101.

Referring to FIG. 5, in operation 501, the electronic device 101 (e.g., the processor 120) according to various embodiments may perform the beam search. For example, as shown in FIG. 6, in the beam search operation, a base station 320 may use four tx beams 620 through 623, and the electronic device 101 may use five rx beams 610 through 614. For example, in an initial access, synchronization signal block (SSB) sets 630 through 634 may be transmitted at intervals of 20 ms. Herein, SSBs belonging to the SSB sets 630 through 634 respectively may be transmitted through different tx beams. In this case, during one period, the electronic device 101 may receive SSBs by steadily using one rx beam, and measure reference signals received power (RSRP) for beam pairs used to transmit and receive the SSBs.

According to various embodiments, in operation 503, the electronic device 101 may generate measurement results of the beam pairs of the tx beams of the base station 320 and the rx beams of the electronic device 101. For example, the electronic device 101 may measure signal strength values of a plurality of tx beams transmitted from at least one base station 320 and having different directions, using a plurality of rx beams, and thus generate (the number of the rx beams) x (the number of the tx beams) measurement results. As another example, the electronic device 101 may generate a measurement result including a set of RSRP values for the rx beams for each tx beam of the base station 320. The RSRP value set for one tx beam may include indexes of the rx beams and RSRP values corresponding to the indexes respectively. For example, in FIG. 6, the electronic device 101 may generate an RSRP value set including RSRP values for the five rx beams 610 through 614 of the electronic device 101 corresponding to one tx beam of the base station 320. Since the base station 320 uses four tx beams 620 through 623, four RSRP value sets may be generated.

According to various embodiments, in operation 505, the electronic device 101 may determine a method for selecting an optimal beam pair of the tx beam and the rx beam based on the measurement results. For example, based at least in part on the measurement results, the electronic device 101 may determine one of a plurality of methods for selecting one of (the number of the rx beams) x (the number of the tx beams) beam pairs, and select the beam pair according to the selected method. According to various embodiments, the electronic device 101 may identify and generate a metric value corresponding to each beam pair, and select the optimal beam pair based at least in part on a comparison result of the metric values. According to an embodiment, the metric value may be stored in a memory (e.g., the memory 130) of the electronic device 101. According to an embodiment, the metric value may be determined based on the RSRP of the corresponding beam pair and/or the RSRP of at least one other beam pair (e.g., a beam pair including an adjacent rx beam, a beam pair including a non-adjacent rx beam) which is different from the corresponding beam pair. For example, if the electronic device 101 operates in a basic mode, the metric value may indicate the RSRP value of the corresponding beam pair, wherein the optimal beam pair may be selected to the beam pair having the greatest value among the metric values. For example, if the electronic device 101 operates in a mobility improvement mode or a blocking improvement mode, the metric value may be a value based on the RSRP of at least one beam pair different from the corresponding beam pair, wherein the optimal beam pair may be selected to the beam pair having the greatest value among the metric values. For example, the electronic device 101 may select an optimal beam pair by comparing average values for the RSRP values. For example, the electronic device 101 may calculate the average values for the RSRP values for the beam pairs of the rx beam for each tx beam, and select the optimal beam pair by comparing the average values. According to an embodiment, the average value may be calculated by multiplying the RSRP value of the beam pairs by a weight.

According to various embodiments, as described above, the electronic device 101 may generate the metric value per beam pair for selecting the optimal beam pair. According to an embodiment, the metric value may be stored in a memory (e.g., memory 130) of the electronic device 101. According to various embodiments, the metric value may be determined based on RSRP values for a corresponding beam pair and/or at least one other beam pair. In so doing, the at least one other beam pair may be selected differently according to a state (e.g., a mobility state or a blocking state) of the electronic device.

According to various embodiments, the electronic device 101 may be in a high mobility state. For example, the user may be moving while holding the electronic device 101. To maintain the signal quality during the movement, the electronic device 101 may simultaneously consider RSRP values of a plurality of rx beams, if selecting optimal tx beam and rx beam. For example, the RSRP values for the beam pairs which include the tx beam of the same base station and different rx beams may be considered. If there is a tx beam (or SSB) in which RSRP values of spatially adjacent rx beams are uniform and strong, the beam may be selected as the optimal tx beam. In this case, since the plurality of the rx beams is relatively evenly strong, even though the electronic device 101 moves, data connection may be maintained without changing the rx beam if the electronic device moves within a specific range. And data connection may be stably maintained by changing the rx beam without changing the tx beam if the electronic device moves out of the specific range occurs.

According to various embodiments, to prevent the signal blocking, RSRPs of a plurality of rx beams may be considered at the same time. For example, if the signal blocking is instantaneously caused by a person or an object, the received signal strength of the electronic device 101 may be deteriorated. To overcome this with the blocking in the electronic device 101, a tx beam in which RSRP values for rx beams which are away from each other, or are not adjacent to each other have a relatively greater distribution than RSRPs for the remaining rx beams may be selected. In this case, even if the signal being received at the electronic device 101 is blocked and the signal strength rapidly degrades, the electronic device 101 may maintain the data connection by changing the rx beam to other beam which is not adjacent to the rx beam.

According to various embodiments, if identifying the mobility state, the electronic device 101 may determine the operation mode to the mobility improvement mode. For example, the electronic device 101 may determine whether the electronic device 101 is in the mobility state based on the measurement result generated in operation 503. For example, if observing dominant distribution of the RSRPs of adjacent beams based on a specific rx beam, in an RSRP set including a maximum value among the RSRP values, the electronic device 101 may be determined to be mobile. According to various embodiments, if identifying the signal blocking state, the electronic device 101 may determine the operation mode to the blocking improvement mode. For example, the electronic device 101 may determine whether the electronic device 101 is in the signal blocking state based on the measurement result generated in operation 503. For example, if observing dominant distribution of the RSRPs of the adjacent beams based on the specific rx beam, in the RSRP set including the maximum value among the RSRP values, the electronic device 101 may determine the signal blocking state.

Figure 7:
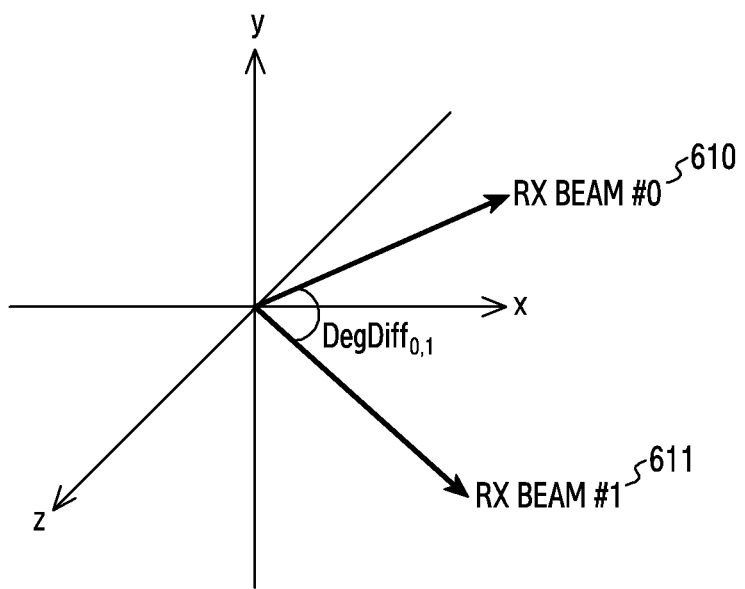
FIG. 7 is an example of representation of an angle between rx beams in an electronic device 101 according to various embodiments.

According to various embodiments, the electronic device 101 may operate in the mobility improvement mode if identifying the mobility state, and may operate in the blocking improvement mode if identifying the signal blocking state. According to an embodiment, the electronic device 101 may change the operation mode. For example, the electronic device 101 may change the method for selecting the beam pair from the mobility improvement mode to the blocking improvement mode. For the electronic device 101 to operate in the mobility improvement mode or the blocking improvement mode, the electronic device 101 may first determine whether the rx beams are adjacent or non-adjacent. FIG. 7 is an example of representation of an angle between rx beams in the electronic device 101 according to various embodiments.

Referring to FIG. 7, according to various embodiments, a rx beam #0 610 and a rx beam #1 611 among the plurality of the rx beams formed by an antenna array (e.g., the antenna array 415 of FIG. 4) may be expressed using a vector. The rx beam #0 610 and the rx beam #1 611 may be displayed on three-dimensional coordinates. In FIG. 7, the angle between the rx beam #0 610 and the rx beam #1 611 may be $DegDiff_{0,1}$. If $DegDiff_{0,1}$ is smaller than a threshold (e.g., AdjDegThreshold), the two rx beams 610 and 611 may be determined to be adjacent. In another embodiment, if $DegDiff_{0,1}$ is greater than a threshold (e.g., NonAdjDegThreshold), the two rx beams 610 and 611 may be determined to be non-adjacent.

According to various embodiments, a pattern of adjacent beams or a pattern of non-adjacent beams may be predefined, according to the angle representation between the rx beams explained in FIG. 7. The pattern of the adjacent beams or the pattern of the non-adjacent beams may be defined differently depending on how the rx beam of the electronic device 101 is configured.

According to various embodiments, the electronic device 101 may determine whether the rx beams are adjacent or non-adjacent without measuring the angle between the rx beam vectors. For example, the electronic device 101 may determine the angle between the rx beams, or determine whether they are adjacent or non-adjacent, through an operation of identifying a beam book table. The electronic device 101 may determine whether the rx beams are adjacent or not adjacent based on a mapped number stored in the electronic device 101 in the form of a beam book or a beam code book for the rx beam.

Figure 8A:
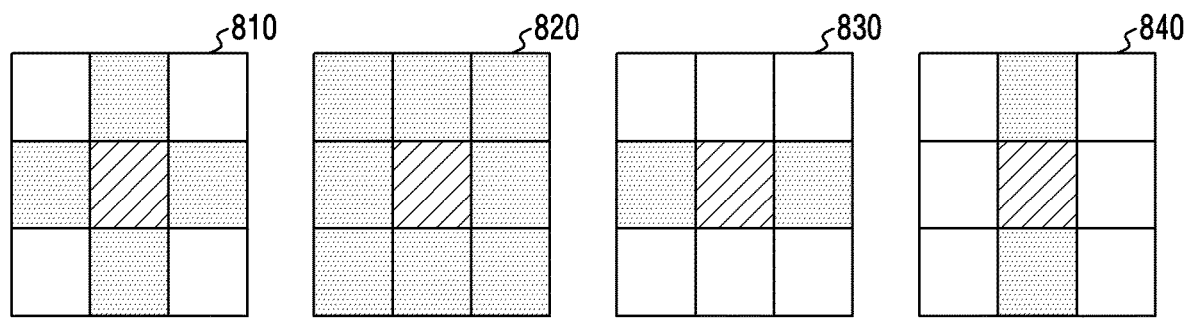
FIGS. 8A and 8B are examples of adjacent rx beam patterns in electronic device according to various embodiments.
Figure 8B:
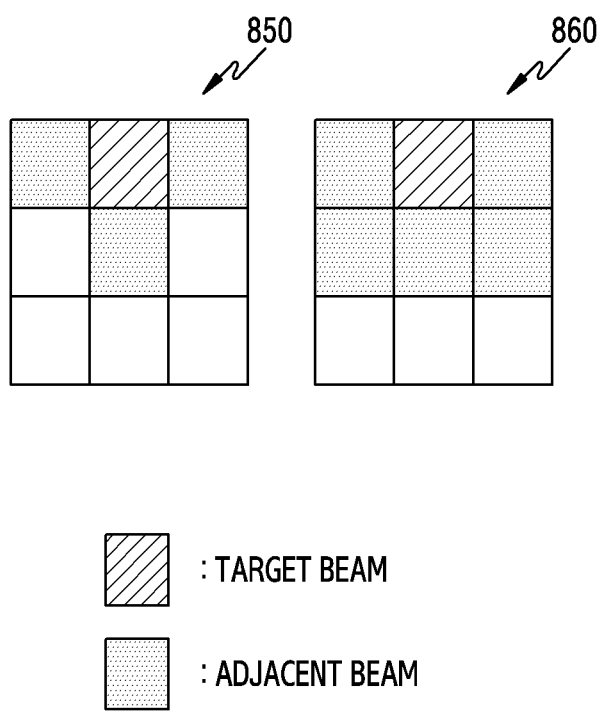

FIGS. 8A and 8B are examples of adjacent rx beam patterns in an electronic device 101 according to various embodiments. According to various embodiments, the electronic device 101 may use at least one of various adjacent beam patterns 810 through 860. FIG. 8A and FIG. 8B, nine small squares each indicate one rx beam, and a relative positional relationship of the squares may indicate a relative direction relationship of the rx beam. Accordingly, the angle between the beams indicated by the squares adjacent to each other may be less than or equal to a threshold. For example, a beam corresponding to a square shown on the right of a target beam may be understood as a beam rotated x° to the right from the target beam.

According to various embodiments, at least one adjacent beam may be defined, based on the target beam. For example, if the target beam is positioned at the center as shown in FIG. 8A, the adjacent beam patterns of the pattern 810 in which the adjacent beams are positioned in a horizontal or vertical direction, the pattern 820 in which the adjacent beams are positioned in eight directions including horizontal, vertical, or facing diagonal directions, the pattern 830 in which the adjacent beams are positioned in the horizontal direction, and the pattern 840 in which the positions of the adjacent beams are positioned in the vertical direction may be defined.

According to various embodiments, as shown in FIG. 8B, the patterns 850 and 860 in which the target beam is positioned at the upper center may be defined, and in this case, the pattern of the adjacent beams may be determined differently from the case where the target beam is positioned at the center. If the target beam is positioned at the boundary as shown in FIG. 8B, the adjacent beam patterns of the pattern 850 in which the adjacent beams are positioned at the left and right tops, and the center, and the pattern 860 in which the adjacent beams are positioned at the left and right, the left and right tops, and the center may be defined. The various adjacent beam patterns 810 through 860 may indicate a position for the electronic device 101 to determine that the rx beam is adjacent. Hence, the number and the position of the rx beams determined as the adjacent beams may vary depending on the adjacent beam pattern used.

According to various embodiments, the pattern of the adjacent beams may be identified based on an angle formed by the directions of the beams. For example, the electronic device 101 may identify the angle between the rx beams, and identify and use at least one of the adjacent beam patterns 810 through 860 stored in a memory (e.g., the memory 130) of the electronic device 101. According to various embodiments, the electronic device 101 may pre-identify the patterns of the adjacent beams based on rx beam information stored in the memory (e.g., the memory 130) of the electronic device 101. These patterns may be formed differently depending on how the rx beams of the electronic device 101 are configured (e.g., the number of the rx beams, the angle between the rx beams). The electronic device 101 may use other patterns than the depicted patterns 810 through 860, and the memory (e.g., memory 130) of the electronic device 101 may store other patterns than the depicted patterns 810 through 860.

Figure 9:
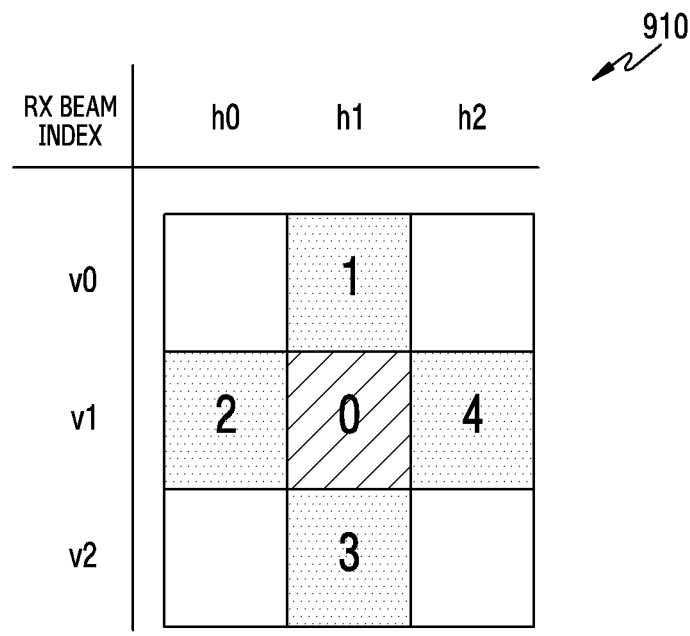
FIG. 9 is an example of determining a plurality of adjacent rx beams in an electronic device according to various embodiments.

FIG. 9 is an example of determining a plurality of adjacent rx beams in an electronic device 101 according to various embodiments. Referring to FIG. 9, according to various embodiments, it may be the example in which a 0-th rx beam is a beam having the greatest RSRP value if measuring a specific SSB, and first through fourth beams are determined to be adjacent to the 0-th beam. If determining that the greatest value of $DegDiff_{0,1}$, $DegDiff_{0,2}$, $DegDiff_{0,3}$, and $DegDiff_{0,4}$ is smaller than a threshold (e.g., AdjDegThreshold), the electronic device 101 may identify adjacent beams according to a pattern 910 shown in FIG. 9. The rx beams each may have an index based on horizontal and vertical components. For example, the rx beams each may have a horizontal component index of (h0, h1, . . . ) from left to right in the beam pattern, and may have a vertical component index of (v0, v1, . . . ) from top to bottom. For example, it may be defined that the index of the 0-th beam is (h1, v1), the index of the first upper beam based on the 0-th beam is (h1, v0), the index of the second left beam is (h0, v1), the index of the third lower beam is (h1, v2), and the index of the fourth right beam is (h2, v1). In addition, a set of the adjacent rx beams at the 0-th beam may be defined as AdjBeam1dx0 ={1, 2, 3, 4}.

According to various embodiments, through such operations, the electronic device 101 may configure a set of adjacent beams for all the rx beams, and select a beam pair using the set of the adjacent beams. According to an embodiment, since the adjacency relationship may be calculated in advance, there may be no calculations for determining the adjacency relationship.

Figure 10:
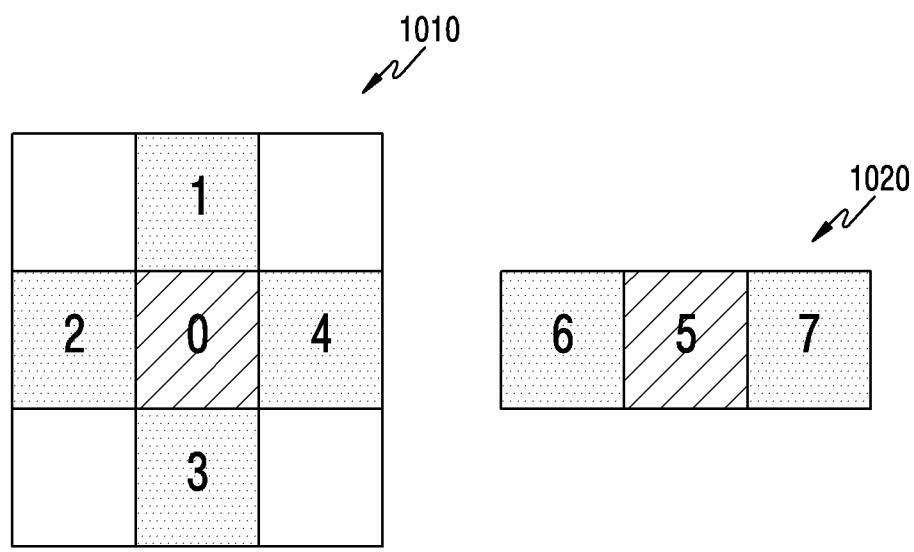
FIG. 10 is an example of determining an adjacent beam if an electronic device has a plurality of antenna modules according to various embodiments.
Figure 10:
Figure 10:

FIG. 10 is an example of determining an adjacent beam if an electronic device 101 has a plurality of antenna modules according to various embodiments. According to various embodiments, FIGS. 8A, 8B, and 9 have been described on the assumption that there is only one antenna, but the adjacent beam determining method may be identical even if the plurality of the antenna modules is provided.

According to various embodiments, a case where there are an array antenna (e.g., the antenna array 415 of FIG. 4) and a patch antenna (e.g., the antenna module 197 of FIG. 1) is described. The patch antenna may include a conductive pattern. If an angle difference between a 0-th target beam in an array antenna pattern 1010 and a sixth beam in a patch antenna pattern 1020 is smaller than AdjDegThreshold, even a beam formed by the patch antenna may be included in an adjacent beam set of the beam formed by the array antenna. Thus, even beams formed by different antennas may have the adjacency relationship. For example, a set of adjacent rx beams in the 0-th beam may be defined as AdjBeam1dx0={1, 2, 3, 4, 6}, the set AdjBeam1dx0 may be at least temporarily stored in a memory (e.g., memory 130) of the electronic device 101, and the stored set may be used to select a beam pair. According to various embodiments, even if measuring an RSRP of a SSB by using a plurality of antenna modules, the electronic device 101 may select an optimal beam pair using whether rx beams formed by the plurality of the antenna modules are adjacent. For example, the plurality of the antenna modules may be considered even in determining a non-adjacent beam.

According to various embodiments, as shown in FIG. 10, if there are two different antenna modules, properties of the rx beams formed by the antenna modules respectively may be different. For example, a beam width of the rx beam formed by the first antenna module (e.g., the array antenna) may be narrower than a beam width of the rx beam formed by the second antenna module (e.g., the patch antenna). In an embodiment, in terms of stability, high priority may be assigned to using the rx beam having the wide beam width. For example, if the electronic device 101 selects the optimal beam pair using the plurality of the antenna modules, the beam width of the rx beam formed in each antenna may be considered. Hence, in selecting the optimal beam pair, even if the rx beam (e.g., the 0-th beam) formed by the first antenna module has more adjacent beam than the rx beam (e.g., a fifth beam) formed by the second antenna module or has a greater RSRP value or RSRP average value, the electronic device 101 may select the rx beam (e.g., the fifth beam) formed by the second antenna module.

According to various embodiments, patterns of non-adjacent beams may be predefined using the angle between the rx beams described in FIG. 7. Since these patterns may be formed differently depending on how the rx beams of the electronic device 101 are configured (e.g., the number of the rx beams, the angle between the rx beams), they may have other patterns than the depicted patterns 1110 through 1150.

Figure 11:
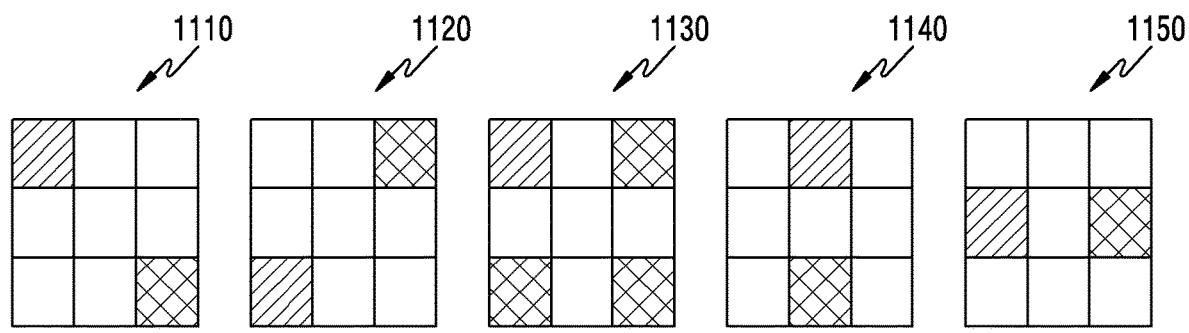
FIG. 11 is examples of non-adjacent rx beam patterns in an electronic device according to various embodiments.
Figure 11:
Figure 11:

FIG. 11 is examples of non-adjacent rx beam patterns in an electronic device 101 according to various embodiments. The electronic device 101 may use at least one of various non-adjacent beam patterns 1110 through 1150, according to various embodiments. In FIG. 11, nine small squares each indicate one rx beam, and a relative positional relationship of the squares may indicate a relative direction relationship of the rx beam. Accordingly, an angle between the beams indicated by the squares adjacent to each other may be less than or equal to a threshold. For example, a beam corresponding to a square shown on the right of a target beam may be understood as a beam rotated x° to the right from the target beam.

According to various embodiments, at least one non-adjacent beam may be defined, based on the target beam. For example, the non-adjacent beam patterns such as the pattern 1110 in which the beams are positioned in the upper left and right directions, the pattern 1120 in which the beams are positioned in the lower left and upper right directions, the pattern 1130 in which the beams are positioned in the left and right upper and lower directions, the pattern 1140 in which the beams are positioned in the upper and lower directions, and the pattern 1150 in which the beams are positioned in the left and right directions may be defined. The various non-adjacent beam patterns 1110 through 1150 may indicate the position for the electronic device 101 to determine that the rx beam is non-adjacent. Hence, the number and the position of the rx beams determined to be the non-adjacent beams may differ depending on the non-adjacent beam pattern used.

According to various embodiments, the pattern of the non-adjacent beams may be identified based on an angle formed by the directions of the beams. For example, the electronic device 101 may identify the angle between the rx beams, and identify and use at least one of the non-adjacent beam patterns 1110 through 1150 stored in a memory (e.g., the memory 130) of the electronic device 101. According to various embodiments, the electronic device 101 may pre-identify the pattern of the non-adjacent beams based on rx beam information stored in the memory (e.g., the memory 130) of the electronic device 101. These patterns may be formed differently depending on how the rx beams of the electronic device 101 are configured (e.g., the number of the rx beams, the angle between the rx beams, etc.). The electronic device 101 may use other patterns than the depicted patterns 1110 through 1150, and the memory (e.g., memory 130) of the electronic device 101 may store other patterns than the depicted patterns 1110 through 1150.

Figure 12:
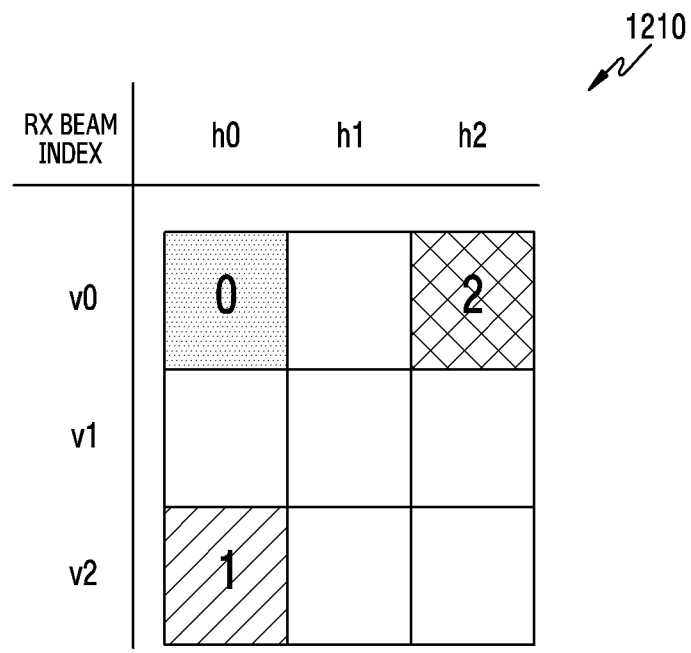
FIG. 12 is an example of determining a plurality of non-adjacent rx beams in an electronic device according to various embodiments.

According to various embodiments, the electronic device 101 may need to determine a beam which is not adjacent, for example, for preparing for the signal blocking, to operate in the blocking improvement mode. For example, in the blocking improvement mode, the electronic device 101 may select a beam pair by considering a rx beam at a non-adjacent position of the strong RSRP if selecting the rx beam to be used for transmitting and receiving a signal, and if the signal blocking occurs in the rx beam used, the data connection stability may be maintained by selecting the non-adjacent rx beam having the strong RSRP which is considered in advance. FIG. 12 is an example of determining a plurality of non-adjacent rx beams in the electronic device 101 according to various embodiments.

According to various embodiments, FIG. 12, which is a case in which it is determined that two of three rx beams 0 through 2 are not adjacent, is the example of the case in which it is determined that the first rx beam is a target beam having the greatest RSRP value in receiving a specific SSB, the 0-th beam is adjacent to the first beam, and the second beam is not adjacent to the first beam. In this case, a rx beam angle difference of the first and second beams may be determined to be the greatest. For example, if determining that $DegDiff_{1,2}$ is greater than a threshold (e.g., NonAdjDegThreshold), and that $DegDiff_{0,1}$ and $DegDiff_{1,2}$ are not greater, the electronic device 101 may have a pattern 1210 of FIG. 12. The rx beams each may have an index based on horizontal and vertical components. For example, the rx beams each may have the horizontal component index of (h0, h1, . . . ) from left to right in the beam pattern, and have the vertical component index of (v0, v1, . . . ) from top to bottom. For example, the index of the 0-th beam may be defined as (h0, v0), the index of the first beam of the second position on the right in the pattern based on the 0-th beam may be defined as (h0, v2), and the index of the second beam of the second position from the bottom may be defined as (h2, v0). Also, a set of the non-adjacent rx beams may be defined as NonAdjBeam1dx={1, 2}.

According to various embodiments, if it is assumed that three rx beams are used to prepare for the signal blocking, and the three rx beams are referred to as a-th, b-th, and c-th beams, all of the three beams may be determined to be not adjacent if a minimum value of difference values of the three angles is greater than a threshold. For example, if it is determined that the minimum value of $DegDiff_{a,b}$, $DegDiff_{b,c}$, and $DegDiff_{c,a}$ is greater than a threshold (e.g., NonAdjDegThreshold), all of the three beams may be determined to be not adjacent. At this time, a set of the non-adjacent rx beams may be defined as NonAdjBeam1dx0={a, b, c}, the set NonAdjBeam1dx0 may be stored at least temporarily in a memory (e.g., memory 130) of the electronic device 101, and the stored set may be used to select a beam pair.

According to various embodiments through the above operations, the electronic device 101 may configure the set of the non-adjacent beams for all the rx beams, and select the beam pair using it. In an embodiment, since the non-adjacency relationship may be calculated in advance, there may be no calculations for determining the non-adjacency relationship.

Figure 13:
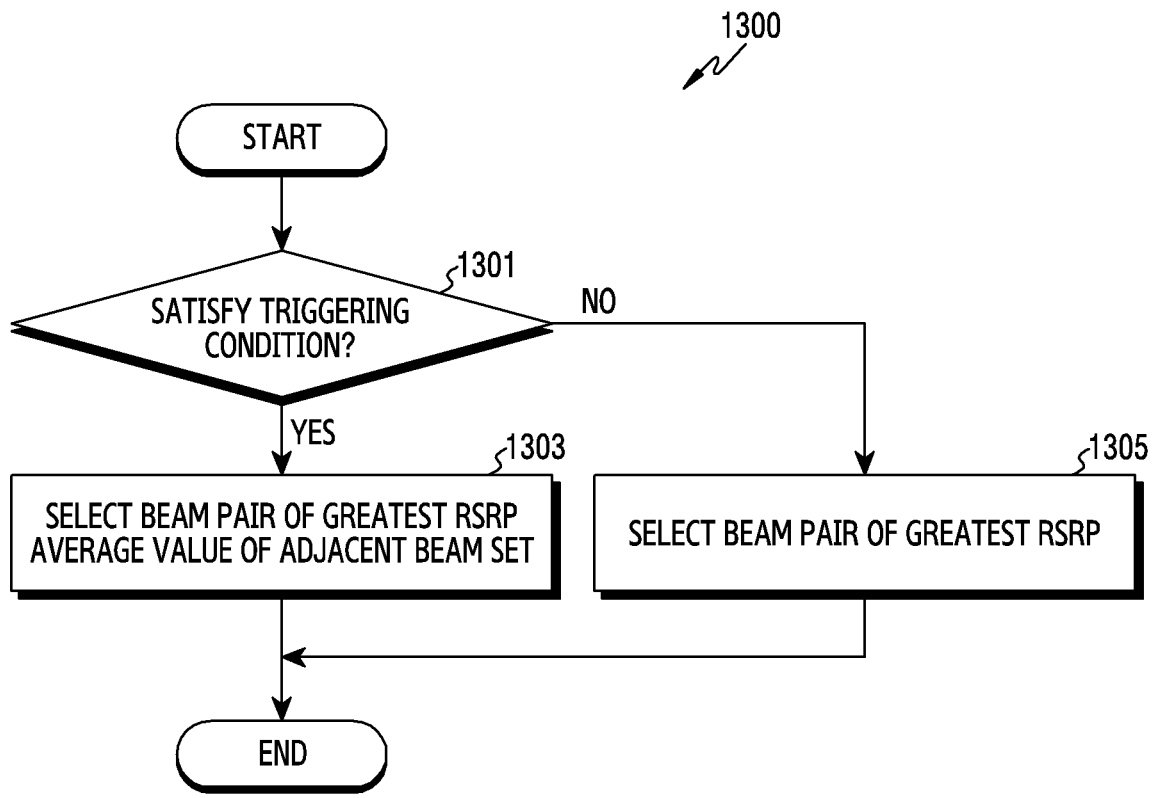
FIG. 13 is a flowchart for selecting a beam pair with mobility in an electronic device according to various embodiments.

FIG. 13 is a flowchart 1300 for selecting a beam pair with mobility in an electronic device 101 according to various embodiments. FIG. 14 is an example of beam pair selection results with mobility in an electronic device according to various embodiments. An operating entity of the flowchart 1300 illustrated in FIG. 13 may be understood as the electronic device 101 or a component (e.g., the processor 120) of the electronic device 101.

Referring to FIG. 13, according to various embodiments, if determining the mobility state, the electronic device 101 may enter the mobility improvement mode for improving the mobility. According to various embodiments, the electronic device 101 (e.g., the processor 120) may determine whether a triggering condition for triggering an operation of selecting an optimal beam pair in the mobility state is satisfied in operation 1301. If satisfying the triggering condition, the electronic device 101 may operate in the mobility improvement mode. Whether the triggering condition is satisfied may be determined based on RSRP values of beam pairs. According to various embodiments, the electronic device 101 may determine whether the triggering condition is satisfied by considering a difference of performance of selecting a beam pair having a maximum RSRP value and performance pair of selecting a beam pair according to the mobility improvement mode.

According to various embodiments, if the electronic device 101 determines that the triggering condition is satisfied, in operation 1303, the electronic device 101 may select a beam pair of the greatest RSRP average value of a rx adjacent beam set. For example, an optimal beam pair may be selected by considering RSRP average values of the adjacent beam set. In determining the average value, the electronic device 101 may assign a weight to the RSRP of each rx beam. For example, if measurement results as shown in FIG. 14 are given, the electronic device 101 may select the optimal beam pair by considering the adjacent beam set, based on RSRP sets 1410 and 1420 for SSB#1 and SSB#2 transmitted through different tx beams. Considering the adjacent beam set of the rx beam, the electronic device 101 may select the beam pair for the stability of the data connection if movement of the electronic device 101 occurs. It may be assumed that the RSRP sets 1410 and 1420 use the pattern 810 illustrated in FIG. 8A. The RSRP of the target beam in the RSRP set 1410 for SSB#1 and the RSRP of the beam having the index (h1, v1) in the RSRP set 1420 of SSB#2 may be identical as −65 dBm. Thus, according to the method of selecting the beam pair having the maximum RSRP, there may be no performance difference, whichever one of a tx beam used to transmit the SSB#1 and a tx beam used to transmit the SSB#2 is selected. However, if the performance of the adjacent beam is simultaneously considered to secure the mobility of the terminal, if RSRPs of adjacent beams belonging to the RSRP set 1420 for SSB#2 are better, the tx beam corresponding to SSB#2 may be selected, rather than selecting the tx beam corresponding to SSB#1. For example, since RSRPs of adjacent beams having the index (h1, v1), (h0, v1), (h1, v2), and (h2, v1) are −70 dBm, −70 dBm, −70 dBm, and −75 dBm in the RSRP set 1420 of SSB#2, and RSRPs of adjacent beams of the index (h1, v1), (h0, v1), (h1, v2), and (h2, v1) in the RSRP set 1410 of SSB#1 are −90 dBm, −90 dBm, −80 dBm, and −90 dBm, SSB#2 having the stronger average intensity of the adjacent beams may be selected. Hence, if the tx beam used to transmit SSB#2 and the target beam are selected as the optimal beam pair, the stability of the data connection may be achieved even if the terminal moves.

According to various embodiments, if the electronic device 101 determines that the triggering condition is not satisfied, in operation 1305, the electronic device 101 may select the beam pair of the greatest RSRP value, without considering the adjacent beam set. For example, among the RSRP values measured generally in (the number of the tx beams x the number of the rx beams), the beam pair of the tx beam and the rx beam of the greatest RSRP may be selected as the optimal beam pair.

According to various embodiments, in the embodiment of FIG. 13, the operation of selecting the optimal beam pair may vary according to whether the triggering condition is satisfied may differ. The triggering condition may be defined variously. According to an embodiment, if the difference between the RSRP value (e.g., $RSRP_{proposed\_adj}$) of the rx beam selected by considering the rx adjacent beam set and the maximum value (e.g., $RSRP_{tot\_max}$) of the RSRP values of all the beam pairs falls within a threshold (e.g., $RSRP_{diff\_threshold}$), the electronic device 101 may determine that the triggering condition is satisfied. In this case, comparing only the absolute reception performance, the reception performance of selecting the rx beam according to the mobility improvement mode may be relatively lower than selecting the rx beam having the maximum RSRP value. For example, the $RSRP_{proposed\_adj}$ value may be smaller than the $RSRP_{tot\_max}$ value. Thus, $RSRP_{diff\_threshold}$ may be set in a range to allow this. In another embodiment, if the $RSRP_{proposed\_adj}$ value is greater than the threshold (e.g., $RSRP_{diff\_threshold}$), the electronic device 101 may determine that the triggering condition is satisfied.

According to various embodiments, in the embodiment of FIG. 13, the electronic device 101 may use an RSRP average value of the adjacent beam set. According to an embodiment, the RSRP average value of the adjacent beam set may be determined based on Equation 1.

$$RSRP_{i,avg} = a_1 \times RSRP_{i,1} + a_2 \times RSRP_{i,2} + \ldots + a_N \times RSRP_{i,N}$$ Equation 1

In <Equation 1>, $RSRP_{i,avg}$ may indicate the average value of the RSRP of the adjacent beam set of the i-th SSB, $RSRP_{i,n}$ may indicate the RSRP value of the i-th SSB measured with the n-th rx beam, N may indicate the number of the beams which are set as the adjacent beams, and $a_i$ may indicate a weight assigned to each beam. Herein, N and $a_i$ are parameters which may be set at the electronic device 101, and a sum of weights may satisfy 1. At this time, $a_1$ may be the weight corresponding to the beam having the greatest RSSP according to the measurement result of the corresponding SSB, and $a_N$ may be the weight corresponding to the beam which is the most non-adjacent to $a_1$. For example, if N=3, $a_1$=0.5, $a_2$=0.3, and $a_3$=0.2. As another example, if N=5, $a_1$=0.4, $a_2$=0.3, $a_3$=0.2, $a_4$=0.07, and $a_5$=0.03.

According to various embodiments, in the embodiment of FIG. 13, the electronic device 101 may select the optimal beam pair based on the RSRP average values. According to another embodiment, the electronic device 101 may further consider the beam width of the rx beam. For example, although the RSRP average value of the first rx beam is greater than the RSRP average value of the second rx beam, if the beam width of the second rx beam is wider than the beam width of the first rx beam, the electronic device 101 may select the second rx beam. For example, as the beam width widens, the electronic device 101 may consider the beam width by applying a higher weight to the RSRP average value. If the rx beam of the relatively wide beam width is selected, the data connection stability may be improved in the movement of the electronic device 101.

Figure 15:
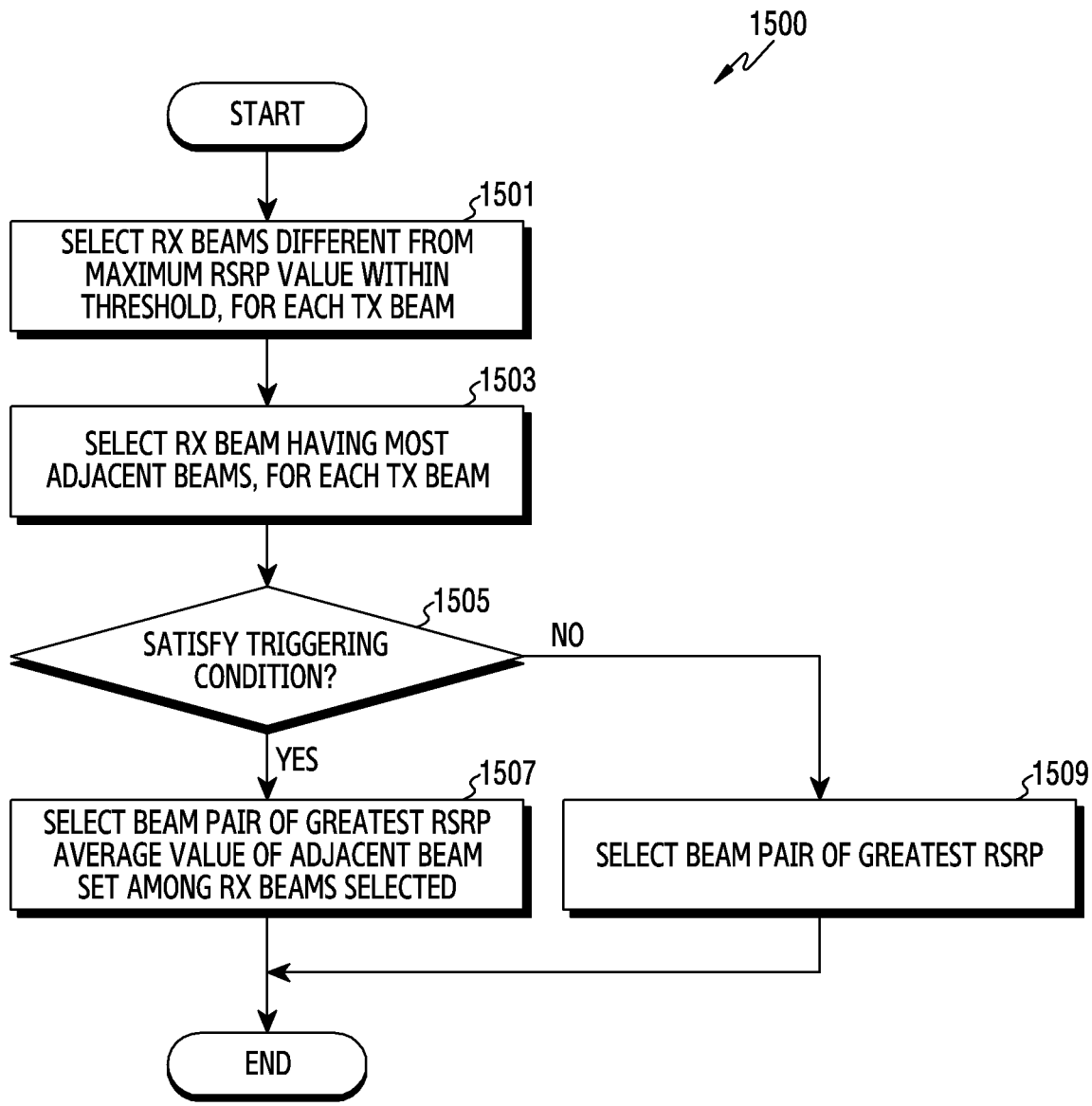
FIG. 15 is a flowchart illustrating another example for selecting a beam pair with mobility in an electronic device according to various embodiments.

FIG. 15 is a flowchart 1500 illustrating another example for selecting a beam pair in a mobility state in an electronic device 101 according to various embodiments. An operating entity of the flowchart 1500 illustrated in FIG. 15 may be understood as the electronic device 101 or a component (e.g., the processor 120) of the electronic device 101.

Referring to FIG. 15, according to various embodiments, if determining the mobility state, the electronic device 101 may enter the mobility improvement mode for improving the mobility. According to various embodiments, in operation 1501, the electronic device 101 (e.g., the processor 120) may select rx beams which are different from the maximum RSRP value within a threshold, for each tx beam. Thus, at least one rx beam which is different from the greatest value within the threshold among the RSRP values for the rx beams used to receive a signal transmitted using a specific tx beam may be selected. For example, if the RSRP value which measures an i-th SSB using a j-th rx beam is $RSRP_{i,j}$, the maximum RSRP value for the i-th tx beam, for example, the maximum value of ($RSRP_{i,1}$, $RSRP_{i,2}$ … $RSRP_{i,nR}$) is $RSRP_{max\_i}$, nR is the number of the rx beams, the RSRP value of a specific rx beam currently used is $RSRP_{i,current}$, and a difference of the $RSRP_{max\_i}$ value and the $RSRP_{i,current}$ value is than a threshold (e.g., $RSRP_{diff\_threshold}$), the specific rx beam currently used may be selected for the i-th tx beam. In some cases, a plurality of rx beams may be selected for one tx beam.

According to various embodiments, the electronic device 101 may select a rx beam having the most adjacent beams, for each tx beam in operation 1503. For example, the electronic device 101 may select the rx beam closest to the center in the beam distribution among at least one rx beam selected for each tx beam in operation 1501 as a candidate beam. For example, the electronic device 101 may select a rx beam capable of obtaining the most adjacent beams for determining an average value of an adjacent beam set as the candidate beam.

According to various embodiments, in operation 1505, the electronic device 101 may determine whether a triggering condition for triggering an operation of selecting an optimal beam pair in the mobility state is satisfied. If satisfying the triggering condition, the electronic device 101 may operate in the mobility improvement mode. Whether the triggering condition is satisfied may be determined based on RSRP values of beam pairs. According to various embodiments, the electronic device 101 may determine whether the triggering condition is satisfied by considering a difference of performance in selecting a beam pair having a maximum RSRP value and performance in selecting a beam pair according to the mobility improvement mode.

According to various embodiments, if determining that the electronic device 101 satisfies the triggering condition, in operation 1507, the electronic device 101 may select the optimal beam pair by considering the RSRP average value of the received adjacent beam set. For example, the beam pair may be selected by considering an average value of RSRPs measured in adjacent beams. In determining the average value, the electronic device 101 may assign a weight to the RSRP of each rx beam.

According to various embodiments, if determining that the electronic device 101 does not satisfy the triggering condition, in operation 1509, the electronic device 101 may select the beam pair of the greatest RSRP value, without considering the rx adjacent beam set. For example, among the RSRP values measured generally in (the number of tx beams x the number of rx beams), the beam pair of the tx beam and the rx beam of the greatest RSRP may be selected as the optimal beam pair.

Referring to FIG. 15, according to various embodiments, in addition to selecting the optimal tx beam and rx beam, matching of the rx beam for each tx beam may be conducted based on RSRP values obtained by the beam search operation. For example, the rx beam matched to each tx beam may be determined. In FIG. 15, the rx beam matched to each tx beam is selected based on the number of the adjacent beams. According to another embodiment, the electronic device 101 may match the rx beam having the maximum RSRP per tx beam to each of the tx beams. For example, the electronic device 101 may match one rx beam to each of the tx beams by considering the performance of the plurality of the rx beams corresponding to the tx beams respectively. For example, assuming that the numbers of the rx beams corresponding to SSB#2 are 2 and 5, the electronic device 101 may alternately measure the RSRP values of the second rx beam and the fifth rx beam, and match the rx beam having the greater RSRP among the two. According to yet another embodiment, the electronic device 101 may randomly select one of the plurality of the rx beams selected corresponding to the tx beam respectively, and match to each tx beam.

Figure 16:
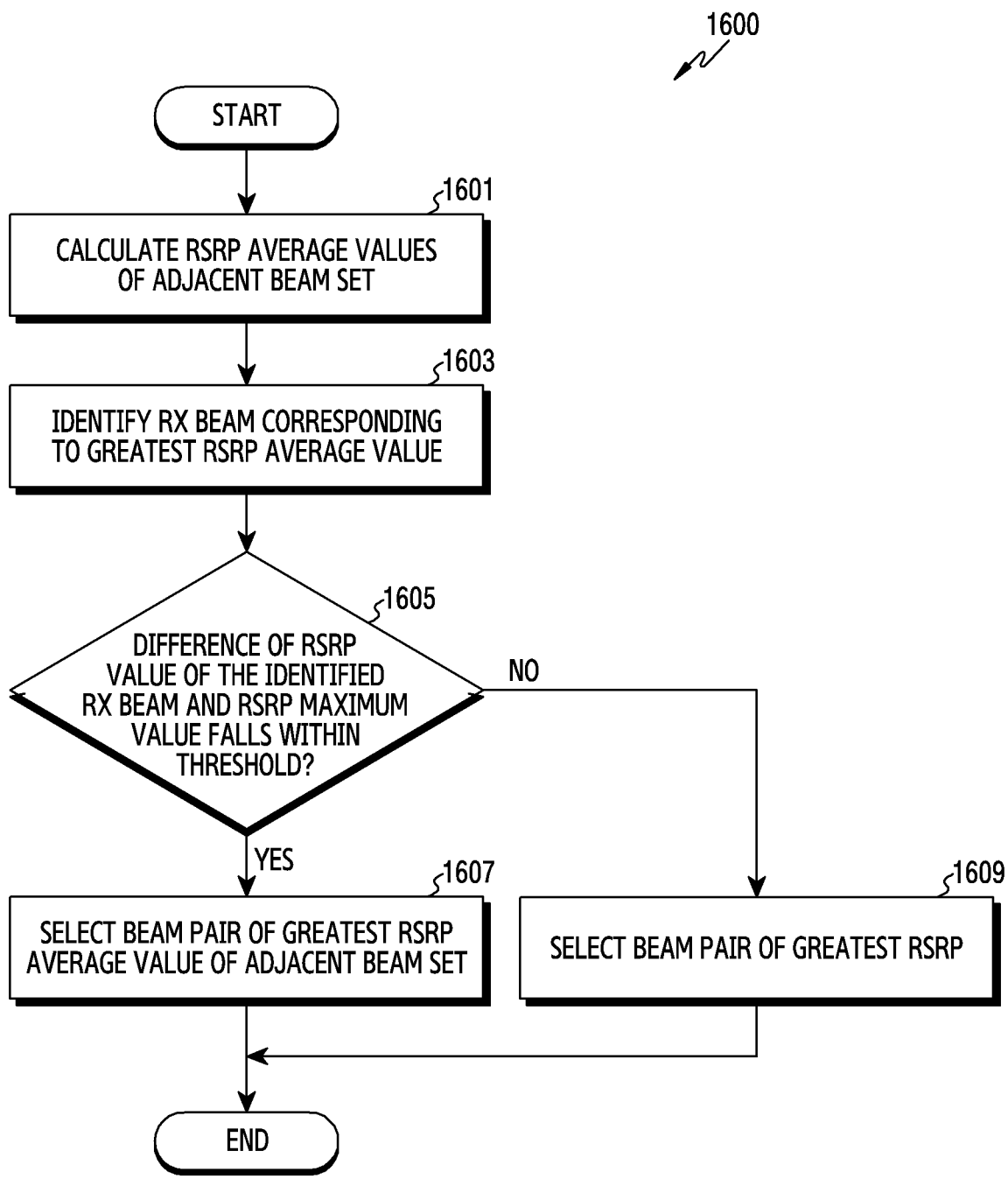
FIG. 16 is a flowchart for selecting a beam pair including an example of a triggering condition with mobility in an electronic device according to various embodiments.

FIG. 16 is a flowchart 1600 for selecting a beam pair including an embodiment of a triggering condition in a mobility state in an electronic device according to various embodiments. An operating entity of the flowchart 1600 illustrated in FIG. 16 may be understood as the electronic device 101 or a component (e.g., the processor 120) of the electronic device 101.

Referring to FIG. 16, according to various embodiments, the electronic device 101 may enter the mobility improvement mode for improving the mobility if determining the mobility state. According to various embodiments, in operation 1601, the electronic device 101 (e.g., the processor 120) may calculate RSRP average values of an adjacent beam set corresponding to respective tx beams. For example, the electronic device 101 may select one rx beam for each tx beam as a candidate beam, and calculate an average of the RSRP values of the rx beams belonging to the adjacent beam set including the candidate beam and the least one adjacent beam of the candidate beam. Hence, the electronic device 101 may acquire RSRP average values as many as the tx beams used by the base station 320. For example, if the base station 320 uses four tx beams 620, 621, 622, and 623 as shown in FIG. 6, the electronic device 101 may calculate RSRP average values of four adjacent beam sets. The RSRP average values of the adjacent beam sets may be calculated by considering a weight.

According to various embodiments, in operation 1603, the electronic device 101 may identify the rx beam corresponding to the greatest RSRP average value. The electronic device 101 may identify the maximum value among the obtained RSRP average values, and identify the candidate beam included in the adjacent beam set having the RSRP average value of the identified maximum value.

According to various embodiments, in operation 1605, the electronic device 101 may determine whether a difference of the RSRP value of the identified rx beam and the maximum value of the RSRP values for beam pairs of all of the tx beams and the rx beams falls within a threshold. For example, the electronic device 101 may determine whether a triggering condition for triggering an operation of selecting an optimal beam pair in the mobility state is satisfied. If satisfying the triggering condition, the electronic device 101 may operate in the mobility improvement mode.

According to various embodiments, if the difference of the RSRP value of the identified rx beam and the maximum value of the RSRP values for the beam pairs of all of the tx beams and the rx beams falls within the threshold, in operation 1607, the electronic device 101 may select the beam pair of the greatest RSRP average value of the adjacent beam set. The electronic device 101 may select the beam pair including the rx beam determined by considering the RSRP average value of the adjacent beam set. For example, the electronic device 101 may operate in a mode which selects and uses the optimal beam pair using the RSRP average value of the adjacent beam set.

According to various embodiments of the present disclosure, if the difference of the RSRP value of the identified rx beam and the maximum value of the RSRP values for the beam pairs of all of the tx beams and the rx beams does not fall within the threshold, in operation 1609, the electronic device 101 may select the beam pair of the greatest RSRP value. For example, the electronic device 101 may operate in a mode which selects and uses the optimal beam pair using the individual RSRP value of the beam pair.

Figure 17:
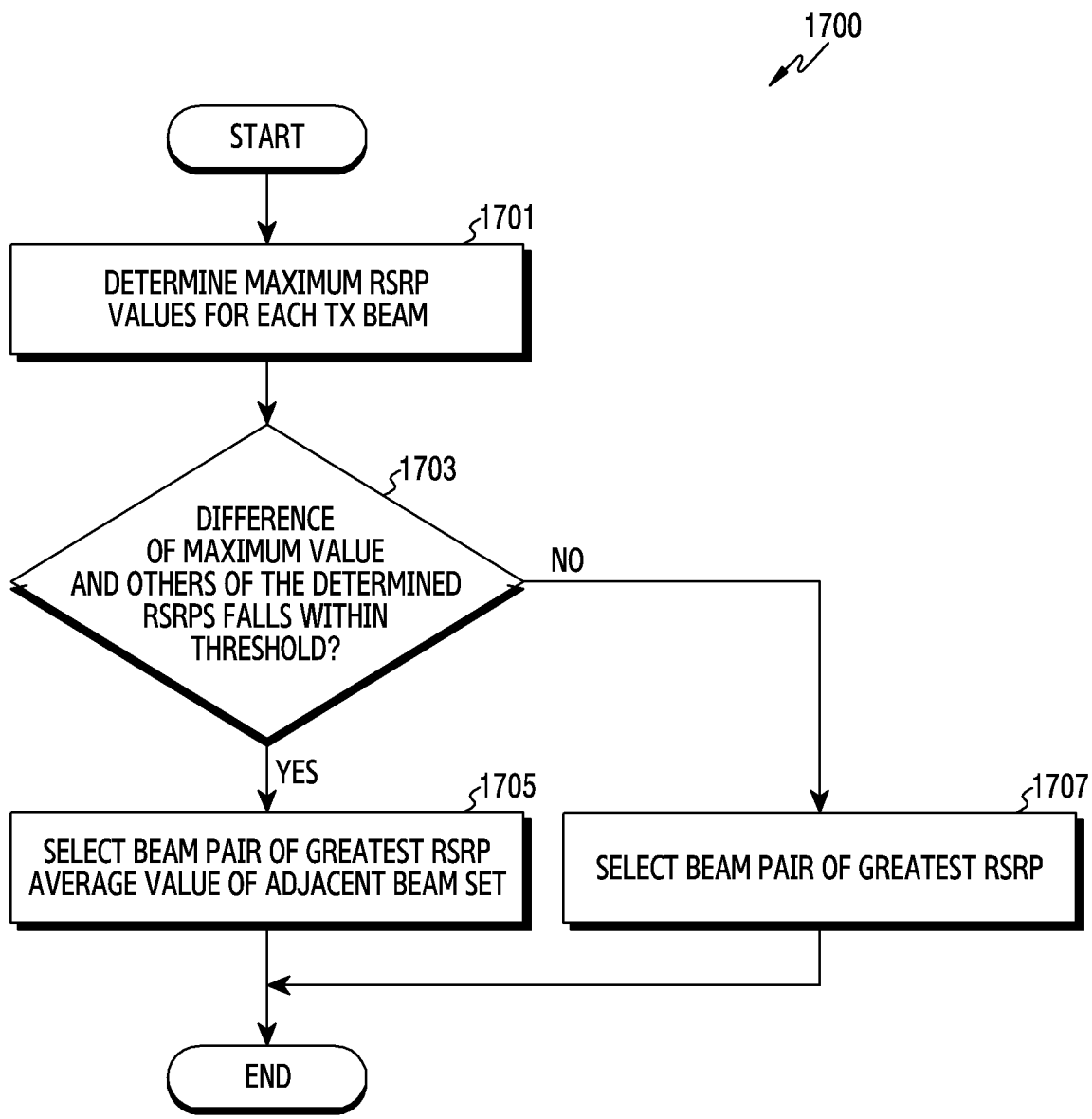
FIG. 17 is a flowchart for selecting a beam pair including another example of a triggering condition with mobility in an electronic device according to various embodiments.

FIG. 17 is a flowchart 1700 for selecting a beam pair including another embodiment of a triggering condition in a mobility state in an electronic device according to various embodiments. An operating entity of the flowchart 1700 illustrated in FIG. 17 may be understood as the electronic device 101 or a component (e.g., the processor 120) of the electronic device 101.

Referring to FIG. 17, according to various embodiments, the electronic device 101 may enter the mobility improvement mode for improving the mobility if determining the mobility state. According to various embodiments, the electronic device 101 (e.g., the processor 120) may determine maximum values among RSRP values of rx beams for each tx beam in operation 1701. One rx beam having the maximum RSRP value may be selected for each tx beam. If, for one tx beam, a plurality of rx beams has the RSRP maximum value, a rx beam which may secure more adjacent beams may be selected. Hence, the electronic device 101 may select RSRP values corresponding to the number of the tx beams used by the base station 320.

According to various embodiments, in operation 1703, the electronic device 101 may determine whether a difference between the maximum value of the determined RSRPs and the remaining RSRP values falls within a threshold. The electronic device 101 may determine whether a triggering condition is satisfied based on the determined RSRP values for each tx beam. If a beam pair is selected by selecting other rx beam than the rx beam having the maximum value among the RSRP values determined for each tx beam, the reception performance may be degraded. For example, although the maximum value of the determined RSRP values has too great value compared with the remaining values, the reception performance may be degraded if the selected rx beam considering the adjacent beam set is the rx beam which is not the maximum value among the determined RSRP values. Hence, whether the triggering condition is satisfied may be evaluated by considering the difference of the maximum value and the remaining values among the determined RSRP values.

According to various embodiments, if the difference between the maximum value and the remaining RSRP values among the determined RSRPs falls within a threshold, in operation 1705, the electronic device 101 may select a beam pair of the greatest RSRP average value of the adjacent beam set. The electronic device 101 may select the beam pair including the rx beam determined by considering the RSRP average value of the adjacent beam set. For example, the electronic device 101 may operate in a mode of selecting and using an optimal beam pair using the RSRP average value of the adjacent beam set.

According to various embodiments, if the difference between the maximum value and the remaining RSRP values among the determined RSRPs does not fall within the threshold, in operation 1707, the electronic device 101 may select a beam pair of the greatest RSRP value. For example, the electronic device 101 may operate in a mode which selects and uses the optimal beam pair using the individual RSRP value of the beam pair.

According to various embodiments, as described above, the electronic device 101 may operate in the mobility improvement mode in the mobility state, and select and use the optimal beam pair according to the mobility improvement mode. Hereinafter, as another embodiment, operations in a state where the electronic device 101 has the signal blocking is explained. According to various embodiments, if the state having the signal blocking, the electronic device 101 may enter the blocking improvement mode for improving the signal blocking.

Figure 18:
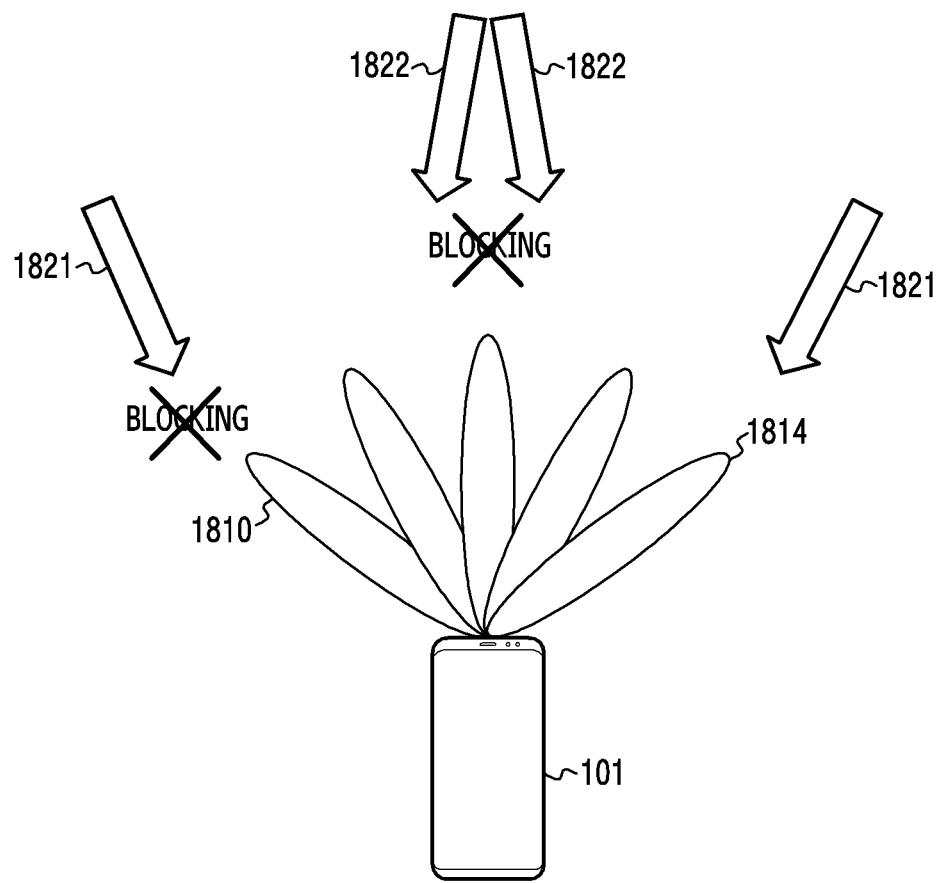
FIG. 18 is an example of a case in which signal blocking occurs for beams in an electronic device according to various embodiments.

FIG. 18 is an example of a case in which signal blocking occurs for beams in an electronic device according to various embodiments. Referring to FIG. 18, according to various embodiments, the signal blocking may occur, while the electronic device 101 selects and uses a beam pair including a tx beam 1822. In this case, data connection may be disconnected, or beam fail may be caused. As a result, data delay or call drop may occur. However, if a tx beam 1821 is selected, rx beams 1810 and 1814 of different directions may provide relatively strong RSRPs. Thus, even if the blocking occurs in a direction of a rx beam 1810, the electronic device 101 may maintain the data connection by changing a beam pair link to the rx beam 1814. As an embodiment for management as described with reference to FIG. 18, the blocking improvement mode operation is described while the electronic device 101 has the signal blocking.

Figure 19:
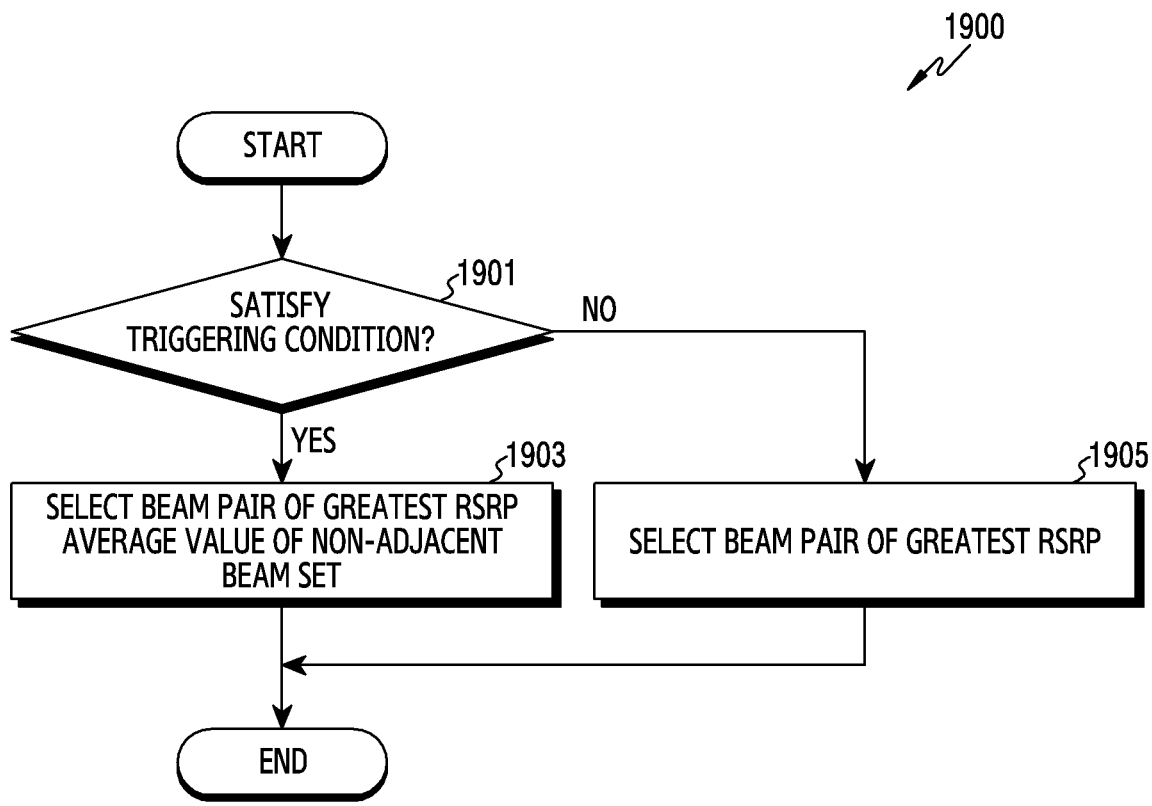
FIG. 19 is a flowchart for selecting a beam pair with signal blocking in an electronic device according to various embodiments.

FIG. 19 is a flowchart 1900 for selecting a beam pair in a signal blocking state in an electronic device 101 according to various embodiments. An operating subject of the flowchart 1900 illustrated in FIG. 19 may be understood as the electronic device 101 or a component (e.g., the processor 120) of the electronic device 101.

Referring to FIG. 19, according to various embodiments, if determining the signal blocking state, the electronic device 101 may enter the blocking improvement mode for improving the signal blocking. According to various embodiments, the electronic device 101 (e.g., the processor 120) may determine whether a triggering condition for triggering an operation of selecting an optimal beam pair in the signal blocking state is satisfied in operation 1901. If satisfying the triggering condition, the electronic device 101 may operate in the blocking improvement mode. Whether the triggering condition is satisfied may be determined based on RSRP values of beam pairs. According to various embodiments, the electronic device 101 may determine whether the triggering condition is satisfied by considering a difference of performance in selecting a beam pair having a maximum RSRP value and performance pair in selecting a beam pair according to the blocking improvement mode.

According to various embodiments, if the electronic device 101 determines that the triggering condition is satisfied, in operation 1903, the electronic device 101 may select a beam pair of the greatest RSRP average value of a non-adjacent beam set. For example, an optimal beam pair may be selected by considering the RSRP average value for non-adjacent beams. In determining the average value, the electronic device 101 may assign a weight to the RSRP of each rx beam.

According to various embodiments, if the electronic device 101 determines that the triggering condition is not satisfied, in operation 1905, the electronic device 101 may select a beam pair of the greatest RSRP value. For example, among the RSRP values measured generally in (the number of tx beams x the number of rx beams), a beam pair of a tx beam and a rx beam having the greatest RSRP may be selected as the optimal beam pair.

According to various embodiments, in the embodiment of FIG. 19, the operation of selecting the optimal beam pair may differ according to whether the triggering condition is satisfied. The triggering condition may be defined variously. According to an embodiment, if a difference between an RSRP value (e.g., $RSRP_{proposed\_NonAdj}$) of an optimal rx beam selected by considering the non-adjacent beam set and a maximum value (e.g., $RSRP_{tot\_max}$) of the RSRP values measuring every tx beam using the rx beam falls within a threshold (e.g., $RSRP_{diff\_threshold}$), the electronic device 101 may determine that the triggering condition is satisfied. In this case, $RSRP_{proposed\_NonAdj}$ indicates a target beam, and may indicate the maximum value of the RSRP values measured with the rx beam belonging to the non-adjacent beam set (e.g., NonAdjBeam1dx). In this case, if comparing only the absolute reception performance, reception performance in selecting the rx beam according to the blocking improvement mode may be relatively lower than selecting the rx beam having the maximum RSRP value. For example, the $RSRP_{proposed\_NonAdj}$ value may be smaller than the $RSRP_{tot\_max}$ value. Hence, $RSRP_{diff\_threshold}$ may be set in a range to allow this. In another embodiment, if the $RSRP_{proposed\_NonAdj}$ value is than greater a threshold (e.g., $RSRP_{trigger\_threshold}$), it may be determined that the triggering condition is satisfied.

According to various embodiments, besides the operations shown in FIG. 19, the electronic device 101 may further perform a tx beam and rx beam matching operation. The electronic device 101 may match the rx beam with respect to each of other tx beams than the tx beam included in the optimal beam pair. If determining that a difference of a maximum RSRP value (e.g., $RSRP_{max\_i}$) for an i-th tx beam and a maximum RSRP value (e.g., $RSRP_{max\_NonAdjBeam1dx\_i}$) of rx beams in a non-adjacent beam set (e.g., NonAdjBeam1dx_i) for the i-th tx beam falls within a threshold (e.g., NonAdjBeam1dx_i), the rx beam having $RSRP_{max\_NonAdjBeam1dx\_i}$ may be matched as the rx beam for the i-th tx beam. If determining that the difference between $RSRP_{max\_i}$ and $RSRP_{max\text{-}NonAdjBeam1dx\_i}$ does not fall within $RSRP_{diff\_threshold}$, the electronic device 101 may match the rx beam having $RSRP_{max\_i}$ as the rx beam for the i-th tx beam. The electronic device 101 may store an index of the matched rx beam.

According to various embodiments, comparing the mobility improvement mode and the blocking improvement mode, their purposes may be different and the optimal beam pairs selected may be different. Since it is not easy for the electronic device 101 to simultaneously apply the mobility improvement mode and the blocking improvement mode by simultaneously determining the mobility state and the signal blocking state, the electronic device 101 may determine either the mobility state or the signal blocking state, and thus determine which one of the operation modes it operates in. For example, the electronic device 101 may determine the operation mode based on measurement results of pairs of the tx beams of the base station 320 and the rx beams of the electronic device 101.

Figure 20:
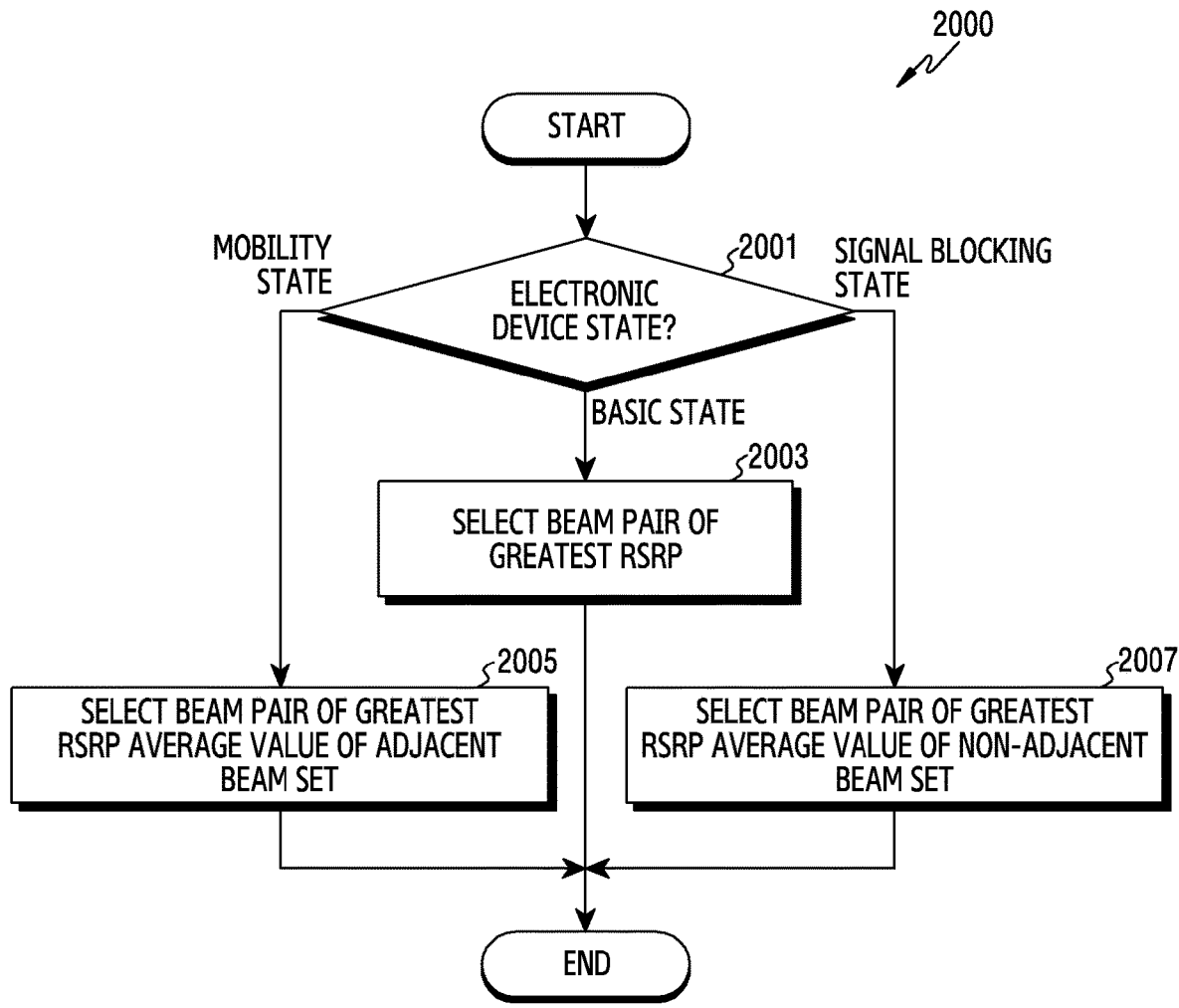
FIG. 20 is a flowchart for changing a method of selecting a beam pair in various states of an electronic device in the electronic device according to various embodiments.
Figure 21:
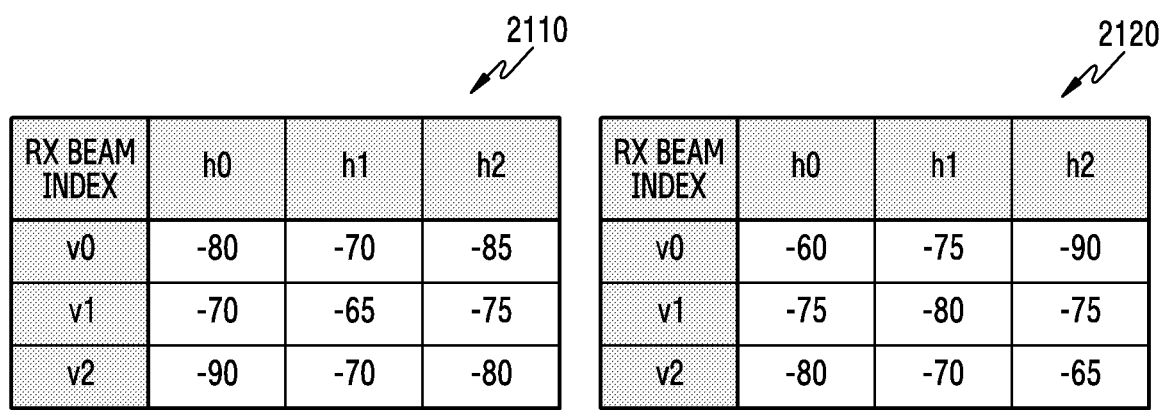
FIG. 21 is examples of RSRP sets adequate for a mobility state and a signal blocking state respectively in an electronic device according to various embodiments.

FIG. 20 is a flowchart 2000 for changing a method of selecting a beam pair in various states of an electronic device in the electronic device according to various embodiments. FIG. 21 is examples of RSRP sets adequate for each of a mobility state and a signal blocking state in an electronic device according to various embodiments. An operating entity of the flowchart 2000 illustrated in FIG. 20 may be understood as the electronic device 101 or a component (e.g., the processor 120) of the electronic device 101.

Referring to FIG. 20, according to various embodiments, in operation 2001, the electronic device 101 may determine a state of the electronic device 101. For example, the method of selecting the beam pair may be configured differently, according to the state of the electronic device 101. The electronic device 101 may select a beam pair by operating in the mobility improvement mode for improving the mobility if determining the mobility state, select a beam pair by operating in the blocking improvement mode for improving the signal blocking if determining the signal blocking state, and select a beam pair by operating in the basic mode, if determining the basic mode rather than the mobility state or the signal blocking state. The electronic device 101 may determine the state of the electronic device 101 based on measurement results of RSRP values for beam pairs of the rx beam per tx beam of the base station 320 generated through the beam search operation, and thus determine a corresponding operation mode. For example, the electronic device 101 may determine the state using an RSRP set including a maximum value of the RSRP values, and select the beam pair by operating in a corresponding operation mode. For example, in the RSRP set including the maximum value of the RSRP values, if observing a distribution in which RSRPs for adjacent beams based on a specific rx beam are dominant, the electronic device 101 may determine that the electronic device 101 is in the mobility state, and select the beam pair by operating in the mobility improvement mode. By contrast, in the RSRP set including the maximum value of the RSRP values, if observing a distribution in which RSRPs for non-adjacent beams are dominant, the electronic device 101 may determine that the electronic device 101 is in the signal blocking state, and select the beam pair by operating in the blocking improvement mode. For example, referring to FIG. 21, if exhibiting a distribution having less change of a RSRP decrease value of adjacent beams in a direction away from the center, based on a beam of the index (h1, v1), as shown in a RSRP set 2110, the electronic device 101 may determine that the electronic device 101 is in the mobility state, and select the mobility improvement mode. For example, if the electronic device 101 selects the beam of the index (h1, v1) having less change of the RSRP decrease value of the adjacent beams in the RSRP set 2110, since the data connection may be stably maintained by changing the rx beam without changing the tx even though a movement over a specific range occurs, the electronic device 101 may select the mobility improvement mode as the operation mode in the mobility state. On the contrary, if exhibiting a distribution of strong RSRPs of a beam of a non-adjacent index (h0, v0) and a beam of the index (h2, v2), as shown in an RSRP set 2120, the electronic device 101 may determine the signal blocking state, and select the blocking improvement mode. To distinguish the distribution of the received strength, the electronic device 101 may sort RSRP values included in a corresponding RSRP set in descending order from the maximum value, and identify whether rx beams of predefined number (e.g., N) having the great RSRP value are adjacent. As a result of identifying, if N-ary rx beams having the great RSRP value are adjacent to each other, the electronic device 101 may select the mobility improvement mode. On the contrary, if at least some of the N-ary rx beams having the great RSRP value are not adjacent to each other, the electronic device 101 may select the blocking improvement mode. If a difference between the RSRP of the rx beam having the greatest RSRP value and the RSRP of the rx beam having the second greatest RSRP value is greater than or equal to a threshold, the electronic device 101 may select the basic mode.

According to various embodiments, if determining the basic mode rather than the mobility state or the signal blocking state, the electronic device 101 may select a beam pair having the greatest RSRP value by operating in the basic mode, in operation 2003. For example, among the RSRP values measured generally in (the number of tx beams x the number of rx beams), a beam pair of a tx beam and a rx beam having the greatest RSRP may be selected as the optimal beam pair.

According to various embodiments, the basic mode may indicate an initial operation state of the terminal. For example, the initial operation state may include a state in which the mobility or the blocking is not detected.

According to various embodiments, if the electronic device 101 determines the mobility state in operation 2001, the electronic device 101 may select a beam pair by considering the RSRP values of the adjacent beam set in operation 2005. For example, the electronic device 101 may select the beam pair having the greatest RSRP average value of the received adjacent beam set. For example, an optimal beam pair may be selected by considering the RSRP average value of the adjacent beam set. In determining the average value, the electronic device 101 may assign a weight to the RSRP of each rx beam. According to various embodiments, if determining the mobility state, the electronic device 101 may determine whether a triggering condition for triggering an operation of selecting an optimal beam pair in the mobility state is satisfied, before selecting the beam pair. If the triggering condition is satisfied, the electronic device 101 may select the beam pair by operating in the mobility improvement mode. For example, if the electronic device 101 determines that the triggering condition is not satisfied, the electronic device 101 may select the beam pair having the greatest RSRP value, without considering the rx adjacent beam set.

According to various embodiments, whether the triggering condition is satisfied may be determined based on the RSRP values of the beam pairs. For example, the electronic device 101 may determine whether the triggering condition is satisfied by considering a difference of performance in selecting the beam pair having the maximum RSRP value and performance in selecting the beam pair according to the mobility improvement mode.

According to various embodiments, if the electronic device 101 determines the signal blocking state, in operation 2007, the electronic device 101 may select a beam pair by considering RSRP values of a non-adjacent beam set. For example, the electronic device 101 may select the beam pair having the greatest RSRP average value of the non-adjacent beam set. For example, the optimal beam pair may be selected by considering the RSRP average value of the non-adjacent beams. In determining the average value, the electronic device 101 may assign a weight to the RSRP of each rx beam. According to various embodiments, if the electronic device 101 determines the signal blocking state, before selecting the beam pair, the electronic device 101 may determine whether a triggering condition for triggering an operation of selecting the optimal beam pair in the signal blocking state is satisfied. If the triggering condition is satisfied, the electronic device 101 may select the beam pair by operating in the blocking improvement mode. For example, if determining that the triggering condition is not satisfied, the electronic device 101 may select a beam pair of the greatest RSRP value. According to various embodiments, whether the triggering condition is satisfied may be determined based on the RSRP values of the beam pairs. For example, the electronic device 101 may determine whether the triggering condition is satisfied by considering a difference of performance in selecting the beam pair having the maximum RSRP value and performance in selecting the beam pair according to the blocking improvement mode.

According to various embodiments, the electronic device 101 may not consider the basic mode if determining the operation mode. For example, in operation 2001, the electronic device 101 may determine the mobility state or the signal blocking state, without considering selecting the basic mode, and determine one of the mobility improvement mode or the blocking improvement mode as the operation mode. Even if the electronic device 101 determines one of the mobility improvement mode or the blocking improvement mode as the operation mode, the triggering condition of each operation mode may be considered.

According to various embodiments, in the embodiment described with reference to FIG. 20, the electronic device 101 may select the mode using the RSRP measurement results. According to another embodiment, the electronic device 101 may select the operation mode using GPS and WiFi information. Since the electronic device 101 may obtain whether the electronic device 101 is positioned indoors or outdoors using the GPS and the WiFi, it may increase the stability of the data connection by determining the operation mode according to the indoor and outdoor environments. If the electronic device 101 is positioned indoors, it may operate in the blocking improvement mode because the signal blocking is highly likely to occur, and if it is positioned outdoors, it may operate in the mobility improvement mode because a movement may occur.

According to various embodiments, the electronic device 101 may determine the operation mode at an initial connection, according to various embodiments mentioned above. Additionally, while operating in either the mobility improvement mode or the blocking improvement mode, the electronic device 1010 may change the mode to the other operation mode. By operating by changing the operation mode depending on a situation, the electronic device 101 may enhance the stability of the data connection.

Figure 22:
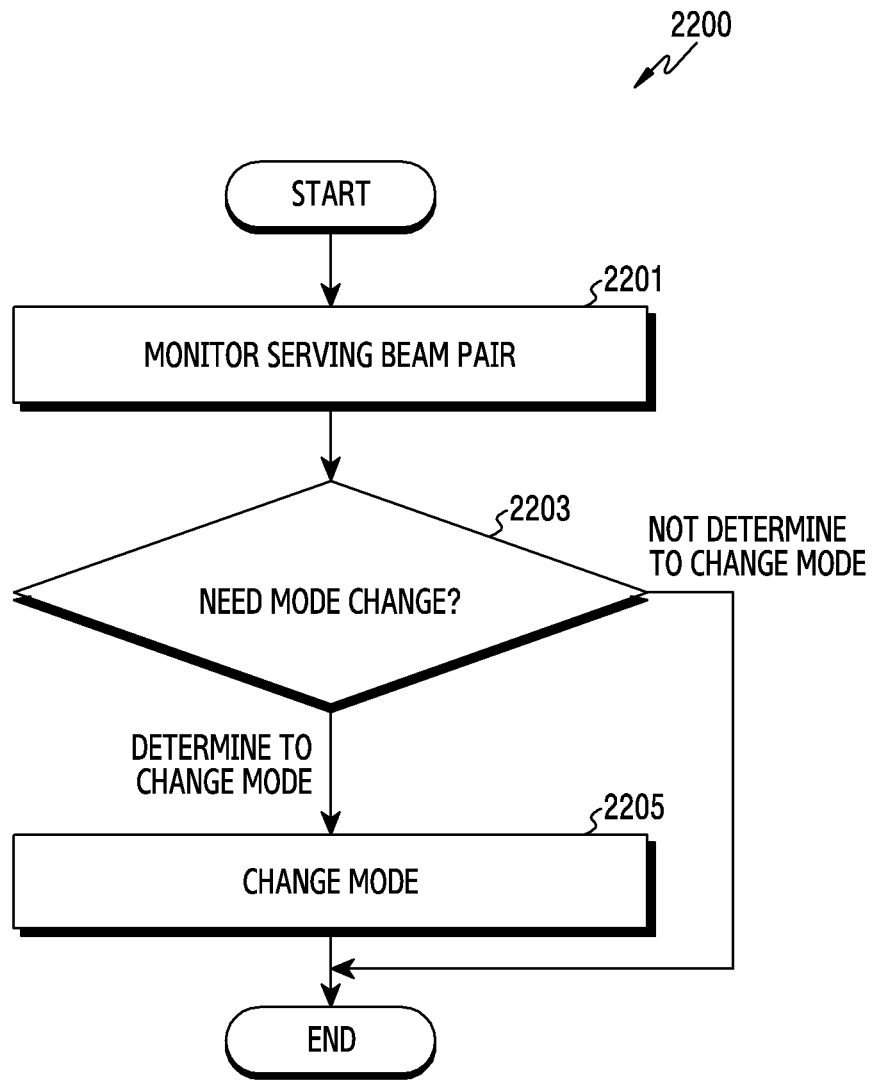
FIG. 22 is a flowchart for changing an operation mode in an electronic device according to various embodiments.

FIG. 22 is a flowchart 2200 for changing an operation mode in an electronic device according to various embodiments. An operation subject of the flowchart 2200 illustrated in FIG. 20 may be understood as the electronic device 101 or a component (e.g., the processor 120) of the electronic device 101.

Referring to FIG. 22, according to various embodiments, in operation 2201, the electronic device 101 may monitor a beam pair link in which a current communication link is established.

According to various embodiments, the electronic device and the base station may establish a communication link using the selected beam pair. The communication link formed by the beam pair between the electronic device and the base station may be referred to as the beam pair link. The electronic device and the base station may perform uplink and/or downlink transmission, based on the beam pair link. For example, the electronic device and the base station may transmit or receive at least one of a control message or data through the beam pair link.

According to various embodiments, the electronic device 101 may monitor RSRP values for a beam pair of a tx beam and a rx beam currently used. Additionally, the electronic device 101 may further monitor RSRP values for other rx beams. The monitoring operation of the electronic device 101 may be performed on a periodic basis.

According to various embodiments, in operation 2203, the electronic device 101 may determine whether an operation mode change is necessary. The electronic device 101 may determine whether the operation mode change is necessary by considering a rx beam set of the beam pair link. For example, the electronic device 101 may determine whether to change the operation mode based on RSRP values for the currently used tx beams and rx beams being monitored. For example, the electronic device 101 may determine whether to change the operation mode by considering a distribution of the RSRP values. If the electronic device 101 is operating in the mobility improvement mode and determines the signal blocking state, it may determine to change the operation mode to the blocking improvement mode. For example, if the rx beam set for the currently used tx beam exhibits a distribution of strong received strengths of non-adjacent beams, the electronic device 101 may determine to change the operation mode to the blocking improvement mode. If the electronic device 101 is operating in the blocking improvement mode and determines the mobility state, it may determine to change the operation mode to the mobility improvement mode. For example, if the rx beam set for the currently used tx beam has the form of the beam set with strong received strengths of adjacent beams, the electronic device 101 may determine to change the operation mode to the mobility improvement mode.

According to various embodiments, if the operation mode change of the electronic device 101 is determined, the electronic device 101 may change the currently operating operation mode to the other operation mode, in operation 2205. For example, the electronic device 101 may change the operation mode to the blocking improvement mode if operating in the mobility improvement mode, and may change the operation mode to the mobility improvement mode if operating in the blocking improvement mode. If the electronic device 101 changes the operation mode, it may operate according to the changed operation mode as described above. If the operation mode change of the electronic device 101 is not determined, the electronic device 101 may maintain the operation mode in use.

According to various embodiments, in the embodiment described with reference to FIG. 20, the electronic device 101 may determine whether to change the operation mode using the RSRP measurement result of the beam pair link. As another example, the electronic device 101 may determine whether to change the operation mode using the GPS and WiFi information. Since the electronic device 101 may obtain whether the electronic device 101 is positioned indoors or outdoors using the GPS and WiFi information, the electronic device 101 may determine whether to change the operation mode according to an indoor and outdoor environment change. For example, if the electronic device 101 is operating in the mobility improvement mode and determines the signal blocking state, it may change the operation mode to the blocking improvement mode. For example, if the electronic device 101 is operating in the mobility improvement mode and moves from outdoors to indoors, the electronic device 101 may change the operation mode to the blocking improvement mode. In addition, for example, if the electronic device 101 is operating in the blocking improvement mode and determines the mobility state, it may change the operation mode to the mobility improvement mode. For example, if the electronic device 101 operating in the blocking improvement mode moves from indoors to outdoors, the electronic device 101 may change the operation mode to the mobility improvement mode.

The present invention has suggested the beam pair selection method for improving the mobility of the electronic device 101 and improving the signal blocking. According to various embodiments, as the electronic device 101 selects the beam for improving the mobility, an RSRP value of a signal actually received at the terminal may be lower than an RSRP maximum value of a signal received using a beam pair of other tx beam and rx beam but the mobility of the terminal may be guaranteed. In addition, by selecting the beam for improving the blocking, if the RSRP is rapidly lowered due to the signal blocking, the electronic device 101 may deal with the signal blocking by using other beam of a strong RSRP than the target beam. Both of the operation modes may improve the stability of the data connection, thus preventing the call drop and the delay.

According to various embodiments, an operating method of an electronic device (e.g., the electronic device 101) may include, performing beam search, generating measurement results of pairs of tx beams and rx beams through the beam search, and selecting an optimal beam pair based on received strength average values for beam pairs of tx beams and rx beams determined from the measurement results.

According to various embodiments, selecting the optimal beam pair may include calculating the received strength average values of the rx beams for each tx beam, and selecting the optimal beam pair based on the received strength average values of the rx beams for each tx beam.

According to various embodiments, selecting the optimal beam pair may include selecting a rx beam for a tx beam having the greatest reception strength average value and a tx beam having the greatest received strength average value as the optimal beam pair.

According to various embodiments, selecting the optimal beam pair may include determining whether a condition for selecting the optimal beam pair is satisfied in a mobility state, and if the condition is satisfied, selecting the optimal beam pair by considering received strength average values of adjacent rx beams.

According to various embodiments, the condition for selecting the optimal beam pair in the mobility state may include that, a difference of a received strength of the rx beam having the greatest received strength average value among the received strength average values of the adjacent rx beams and the greatest received strength for pairs of tx beams and rx beams falls within a threshold.

According to various embodiments, the processor (e.g., the processor 120) may determine whether a condition for selecting the optimal beam pair is satisfied in a signal blocking state, and if the condition is satisfied, select the optimal beam pair by considering received strength average values of non-adjacent rx beams.

According to various embodiments, the condition for selecting the optimal beam pair in the signal blocking state may include that, a difference of a received strength of the rx beam having the greatest received strength average value among the received strength average values of the non-adjacent rx beams and the greatest received strength for the pairs of the tx beams and the rx beams falls within a threshold.

According to various embodiments, selecting the optimal beam pair may include determining one operation mode to operate in a mobility improvement mode or a blocking improvement mode, the mobility improvement mode may be an operation mode for selecting the optimal beam pair by considering adjacent rx beams, and the blocking improvement mode may be an operation mode for selecting the optimal beam pair by considering non-adjacent rx beams.

According to various embodiments, determining the operation mode may include determining a received strength set for rx beams for each tx including the rx beam having the greatest received strength, determining the operation mode to the mobility improvement mode if received strength of adjacent rx beams are strong in the received strength set, and determining the operation mode to the blocking improvement mode if received strength of non-adjacent rx beams are strong in the received strength set.

According to various embodiments, determining the operation mode may include determining whether a location of the electronic device (e.g., the electronic device 101) is indoor or outdoor, determining the mobility improvement mode as the operation mode if the electronic device is located outdoor, and determining the blocking improvement mode as the operation mode if the electronic device is located indoor.

According to various embodiments, determining the operation mode may include monitoring a beam pair link, and changing the operation mode based on the monitoring.

The electronic device according to various embodiments in the present disclosure may be a device of various types. The electronic device may include, for example, a portable communication device (e.g., a smart phone), a computer device, a portable multimedia device, a portable medical device, a camera, a wearable device, or a home appliance. The electronic devices according to an embodiment of the disclosure are not limited to those devices described above.

It should be appreciated that various embodiments of the present disclosure and the terms used therein are not intended to limit the technological features set forth in the disclosure to particular embodiments, and include various changes, equivalents, or replacements of a corresponding embodiment. With regard to the description of the drawings, similar reference numerals may be used to refer to similar or related elements. A singular form of a noun corresponding to an item may include one or more of the items, unless the relevant context clearly indicates otherwise. In the disclosure, each of such phrases as "A or B," "at least one of A and B," "at least one of A or B," "A, B, or C," "at least one of A, B, and C," and "at least one of A, B, or C," may include all possible combinations of the items enumerated together with a corresponding one of the phrases. Such terms as "1st" and "2nd," or "first" and "second" may be used to simply distinguish a corresponding component from another component, and does not limit the components in other aspect (e.g., importance or order). If an element (e.g., a first element) is referred to, with or without the term "operatively" or "communicatively", as "coupled," or "connected" to another element (e.g., a second element), it means that the element may be coupled with the other element directly (e.g., wiredly), wirelessly, or via a third element.

The term "module" used in this disclosure may include a unit implemented in hardware, software or firmware, and may be interchangeably used with other term, for example, logic, logic block, part, or circuitry. The module may be a single integral component, or a minimum unit or part thereof, for performing one or more functions. For example, according to an embodiment, the module may be implemented in a form of an application-specific integrated circuit (ASIC).

Various embodiments of the present disclosure may be implemented as software (e.g., the program 140) including one or more instructions which are stored in a storage medium (e.g., the internal memory 136 or the external memory 138) readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, 'non-transitory' simply means that the storage medium is a tangible device, and does not include a signal (e.g., an electromagnetic wave), but this term does not differentiate between where data is semi-permanently stored in the storage medium and where the data is temporarily stored.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) directly or online via an application store (e.g., Play Store™), or between two user devices (e.g., smart phones). If distributed online, at least part of the computer program product may be temporarily stored in the machine-readable storage medium such as a memory of a manufacturer's server, a server of the application store, or a relay server, or may be temporarily generated.

According to various embodiments, each component (e.g., a module or a program) of the above-described components may include a single entity or multiple entities. According to various embodiments, one or more component or operations of the above-described components may be omitted, or one or more other components or operations may be added. Alternatively or additionally, a plurality of components (e.g., modules or programs) may be integrated as a single component. In this case, the integrated component may perform one or more functions of each component of the plurality of components in the same or similar manner as they are performed by a corresponding component of the plurality of components before the integration. According to various embodiments, operations performed by the module, the program, or other component may be carried out sequentially, in parallel, repeatedly, or heuristically, or one or more of the operations may be executed in a different order or omitted, or one or more other operations may be added.

The invention claimed is:

1. An electronic device comprising:
a housing;
at least one antenna array comprising antenna elements disposed in the housing, or formed in part of the housing;
at least one processor electrically or operatively connected with the antenna array, and configured to form N-ary reception beams (rx beams) having different directions, using the antenna array; and
a memory operatively connected with the processor,
wherein the memory stores instructions for, when executed, causing the processor to,
generate N×M-ary measurement results, by measuring signal strength values of M-ary transmission beams (tx beams) transmitted from at least one base station and having different directions, using the N-ary rx beams,
select one of a plurality of methods for selecting a beam pair among the N×M-ary beam pairs, based at least in part on the measurement results,
wherein the instructions cause the processor to,
determine a state of the electronic device, based at least in part on the measurement results,
select the one of the plurality of the methods, based at least in part on the determined state,
select the beam pair by the selected method, and
establish a beam pair link using the selected beam pair, and
wherein the plurality of the methods comprises a first method for selecting a first beam pair comprising a first rx beam and a first tx beam, if the state is a first state, among the N-ary rx beams, and wherein the first rx beam indicates the greatest measurement value with respect to the first tx beam, and
wherein the instructions cause the processor to establish a first beam pair link using the first beam pair,
wherein the plurality of the methods comprises a second method for selecting a second beam pair comprising a second rx beam and a second tx beam, if the state is a second state in which mobility is greater than the first state, among the N-ary rx beams, wherein the second rx beam indicates the greatest measurement value with respect to the second tx beam, and
wherein the second rx beam is selected by considering measurement values of the second tx beam using rx beams adjacent to the second rx beam, selected according to the direction of the second rx beam, and
wherein the instructions cause the processor to establish a second beam pair link using the second beam pair, and
wherein the N and M are integers greater than or equal to 2.

2. The electronic device of claim 1, wherein the instructions cause the processor to,
at least temporarily store in the memory at least one identification information of at least one rx beam selected according to a direction of a rx beam included in the selected beam pair, based at least in part on the measurement results.

3. The electronic device of claim 1, wherein the instructions cause the processor to,
identify a plurality of angle values formed by each of the direction of the second rx beam and directions of other rx beams, and
select a plurality of rx beams for an angle value lower than a first threshold among the angle values as the adjacent rx beams.

4. The electronic device of claim 3, wherein the instructions cause the processor to,
at least temporarily store a plurality of identification information of the adjacent rx beams in the memory.

5. The electronic device of claim 4, wherein the instructions cause the processor to,
if a signal strength value measured through the second beam pair link falls below a second threshold, establish a third beam pair link by using a third rx beam included in the stored adjacent rx beams.

6. The electronic device of claim 1, wherein the plurality of the methods comprises,
a third method for selecting a third beam pair comprising a third rx beam and a third tx beam, if the state is a third state in which signal blocking from outside is greater than the first state,
among the N-ary rx beams, the third rx beam indicates the greatest measurement value for the third tx beam,
the third rx beam is selected by considering measurement values of the third tx beam using a plurality of non-adjacent rx beams to the third rx beam, selected according to a direction of the third rx beam, and
the instructions cause the processor to establish a third beam pair link using the third beam pair.

7. The electronic device of claim 6, wherein the instructions cause the processor to,
identify a plurality of angle values formed by the direction of the first rx beam and directions of other rx beams, and
determine a plurality of rx beams for angle values higher than a third threshold among the angle values as the non-adjacent rx beams.

8. The electronic device of claim 6, wherein the instructions cause the processor to,
if the signal strength value measured through the first beam pair link falls below a fourth threshold, establish a fourth beam pair link using a fourth rx beam included in the non-adjacent rx beams.

9. An operating method of an electronic device, comprising:
performing beam search;
generating measurement results of pairs of tx beams and rx beams through the beam search;
determining one operation mode corresponding to a mobility state or a signal blocking state;
calculating received strength average values of rx beams for each tx beam based on the measurement results; and
selecting an optimal beam pair based on the determined operation mode and the calculated received strength average values,
wherein selecting the optimal beam pair comprises:
determining whether a condition for selecting the optimal beam pair is satisfied: and
if the condition is satisfied, selecting the optimal beam pair with a rx beam for a tx beam having the greatest reception strength average value and a tx beam having the greatest received strength average value,
wherein the condition comprises that a difference of a received strength of the rx beam having the greatest received strength average value among received strength average values of adjacent rx beams and the greatest received strength for pairs of tx beams and rx beams falls within a threshold if determining an operation mode to a mobility operation mode, and a difference of a received strength of a rx beam having the greatest received strength average value among received strength average values of non-adjacent rx beams and the greatest received strength for the pairs of the tx beams and the rx beams falls within a threshold if determining the operation mode to a blocking operation mode.

10. The method of claim 9, wherein an operation mode corresponding to the mobility state is a mobility improvement mode for selecting the optimal beam pair by considering adjacent rx beams, and
an operation mode corresponding to the signal blocking state is a blocking improvement mode for selecting the optimal beam pair by considering non-adjacent rx beams.

11. The method of claim 9, wherein determining the operation mode comprises:
determining whether a location of the electronic device is indoor or outdoor;
if the location of the electronic device is outdoor, determining a mobility improvement mode corresponding to the mobility state as the operation mode; and
if the location of the electronic device is indoors, determining a blocking improvement mode corresponding to the signal blocking state as the operation mode.

* * * * *